United States Patent
Imai

(10) Patent No.: US 8,015,479 B2
(45) Date of Patent: Sep. 6, 2011

(54) INFORMATION PROCESSING APPARATUS, ELECTRONIC DOCUMENT PROCESSING METHOD, AND STORAGE MEDIUM

(75) Inventor: Hitoshi Imai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1337 days.

(21) Appl. No.: 11/557,665

(22) Filed: Nov. 8, 2006

(65) Prior Publication Data

US 2007/0106930 A1  May 10, 2007

(30) Foreign Application Priority Data

Nov. 9, 2005 (JP) .................. 2005-324745
Oct. 12, 2006 (JP) .................. 2006-278623

(51) Int. Cl.
G06F 17/00 (2006.01)
(52) U.S. Cl. .................. 715/200
(58) Field of Classification Search .......... 715/200, 715/255
See application file for complete search history.

(56) References Cited

U.S. PATENT DOCUMENTS

| 4,903,296 | A | * | 2/1990 | Chandra et al. ............. 705/56 |
| 5,051,891 | A | * | 9/1991 | MacPhail ................. 707/200 |
| 5,077,582 | A | * | 12/1991 | Kravette et al. ............ 399/8 |
| 5,552,901 | A | * | 9/1996 | Kikuchi et al. ............. 358/468 |
| 5,835,922 | A | * | 11/1998 | Shima et al. ............... 715/209 |
| 5,961,602 | A | * | 10/1999 | Thompson et al. ........... 709/229 |
| 6,092,091 | A | * | 7/2000 | Sumita et al. ............. 715/209 |
| 6,185,563 | B1 | * | 2/2001 | Hino ..................... 1/1 |

(Continued)

FOREIGN PATENT DOCUMENTS

JP  2001-175511 A  6/2001

(Continued)

OTHER PUBLICATIONS

Massie et al., The Ganglia Distributed Monitoring System: Design, Implementation, and Experience, Google 2004, pp. 817-840.*

(Continued)

*Primary Examiner* — Cong-Lac Huynh
(74) *Attorney, Agent, or Firm* — Canon USA Inc. IP Division

(57) ABSTRACT

An information processing apparatus stores an application format electronic document having a data structure containing content data, time information, and a program for monitoring the time information. At timing such as the time of power-on, the application format electronic document is loaded to a RAM to be started. Accordingly, the started program can monitor the time information of the application format electronic document.

16 Claims, 20 Drawing Sheets

U.S. PATENT DOCUMENTS

| | | | |
|---|---|---|---|
| 6,789,105 B2 * | 9/2004 | Ludwig et al. | 709/204 |
| 7,539,674 B2 * | 5/2009 | Friedl et al. | 707/5 |
| 7,627,811 B2 * | 12/2009 | Thong et al. | 715/203 |
| 2002/0083284 A1 | 6/2002 | Matsubara et al. | |
| 2003/0009345 A1 * | 1/2003 | Thorpe | 705/1 |
| 2003/0014512 A1 * | 1/2003 | Tanimoto | 709/223 |
| 2003/0041274 A1 * | 2/2003 | Platteter et al. | 713/400 |
| 2003/0105890 A1 | 6/2003 | Sakuma | |
| 2003/0229638 A1 * | 12/2003 | Carpenter et al. | 707/10 |
| 2004/0010701 A1 * | 1/2004 | Umebayashi et al. | 713/193 |
| 2004/0080771 A1 * | 4/2004 | Mihira et al. | 358/1.13 |
| 2004/0098382 A1 * | 5/2004 | Chuang et al. | 707/3 |
| 2004/0194027 A1 | 9/2004 | Suzuki et al. | |
| 2004/0243920 A1 * | 12/2004 | Kato | 715/500 |
| 2005/0088676 A1 * | 4/2005 | Kitada et al. | 358/1.11 |
| 2005/0254080 A1 * | 11/2005 | Kim | 358/1.13 |
| 2005/0270550 A1 * | 12/2005 | Sumio | 358/1.13 |
| 2006/0007474 A1 * | 1/2006 | Daos et al. | 358/1.15 |
| 2006/0041617 A1 * | 2/2006 | Ludwig et al. | 709/204 |
| 2006/0206790 A1 * | 9/2006 | Komamura et al. | 715/500 |
| 2007/0118569 A1 * | 5/2007 | Kishi et al. | 707/200 |
| 2007/0150739 A1 * | 6/2007 | Masui | 713/178 |
| 2007/0168426 A1 * | 7/2007 | Ludwig et al. | 709/204 |
| 2008/0052629 A1 * | 2/2008 | Phillips et al. | 715/736 |
| 2008/0293498 A1 * | 11/2008 | Konishi | 463/43 |
| 2009/0293080 A1 * | 11/2009 | Ramanathan et al. | 725/20 |

FOREIGN PATENT DOCUMENTS

| | | |
|---|---|---|
| JP | 2002-259917 A | 9/2002 |
| JP | 2003-167788 A | 6/2003 |
| JP | 2003-288274 A | 10/2003 |
| JP | 2004-213181 A | 7/2004 |

OTHER PUBLICATIONS

Shobaki, On-Chip Monitoring of Single-and-Multiprocessor Hardware Real-Time Operating System, Google 2002, pp. 1-9.*

Boll et al., Medi/Ether—an Event Space for Context-Aware Multimedia Experience, ACM 2003, pp. 21-30.*

* cited by examiner

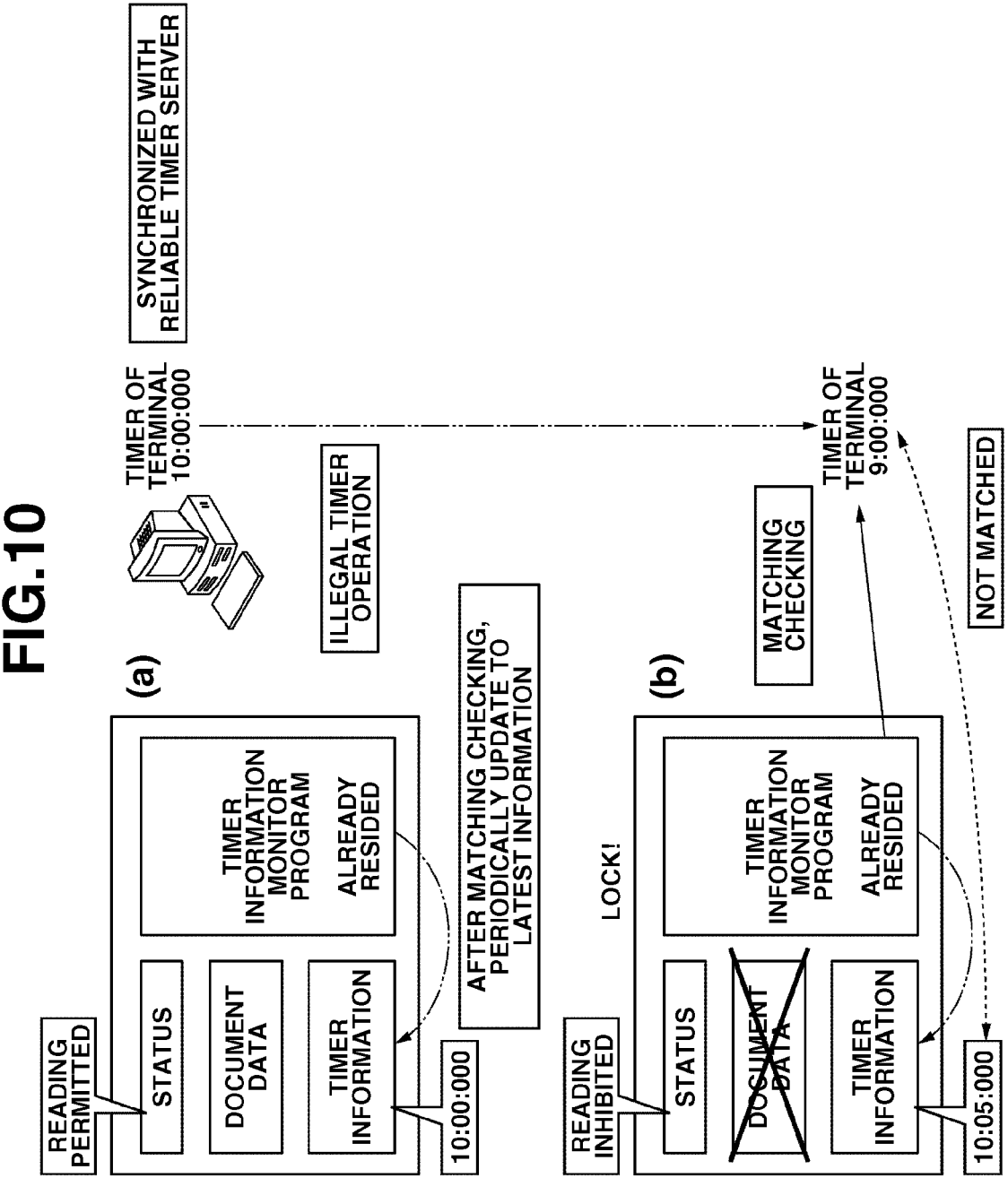

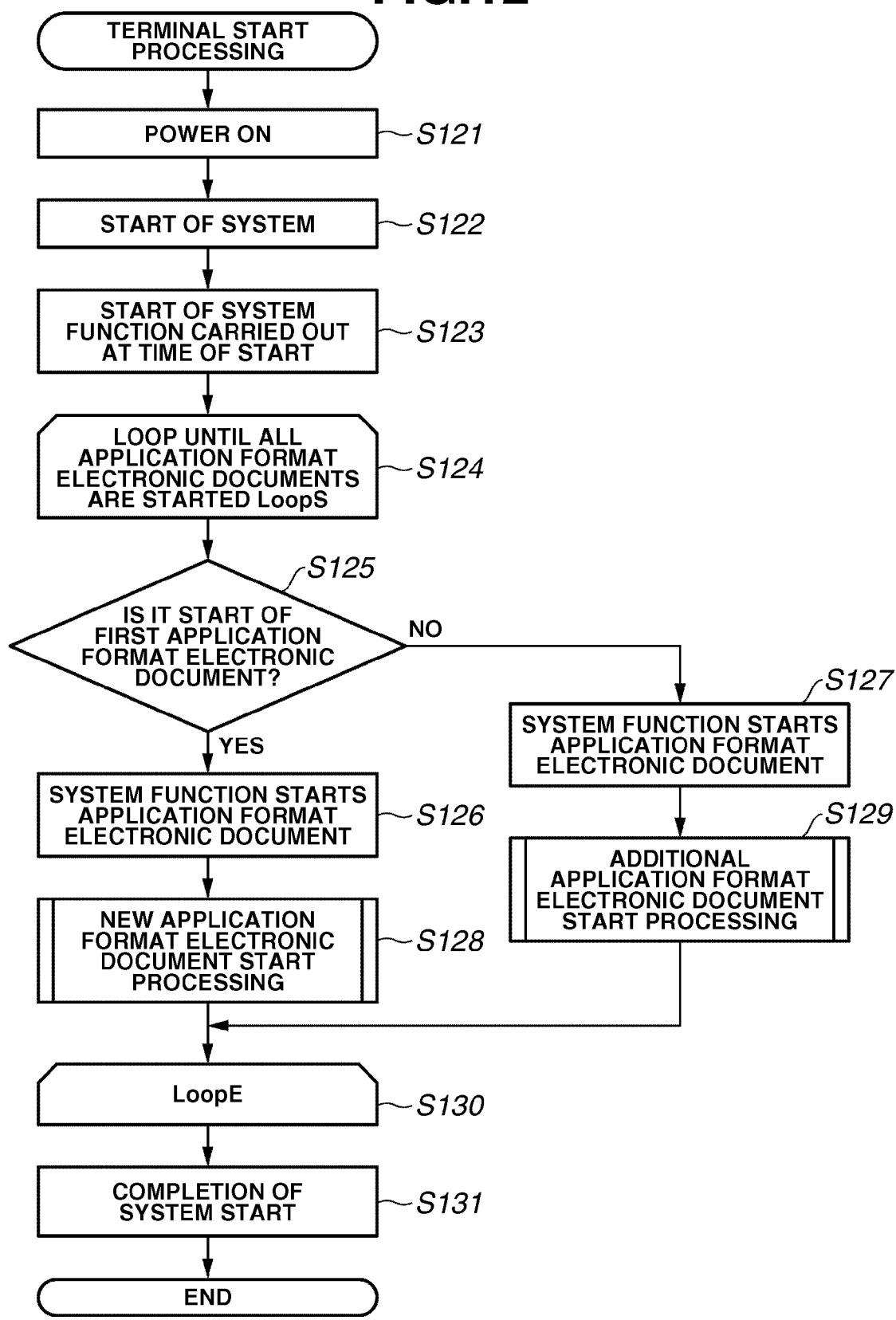

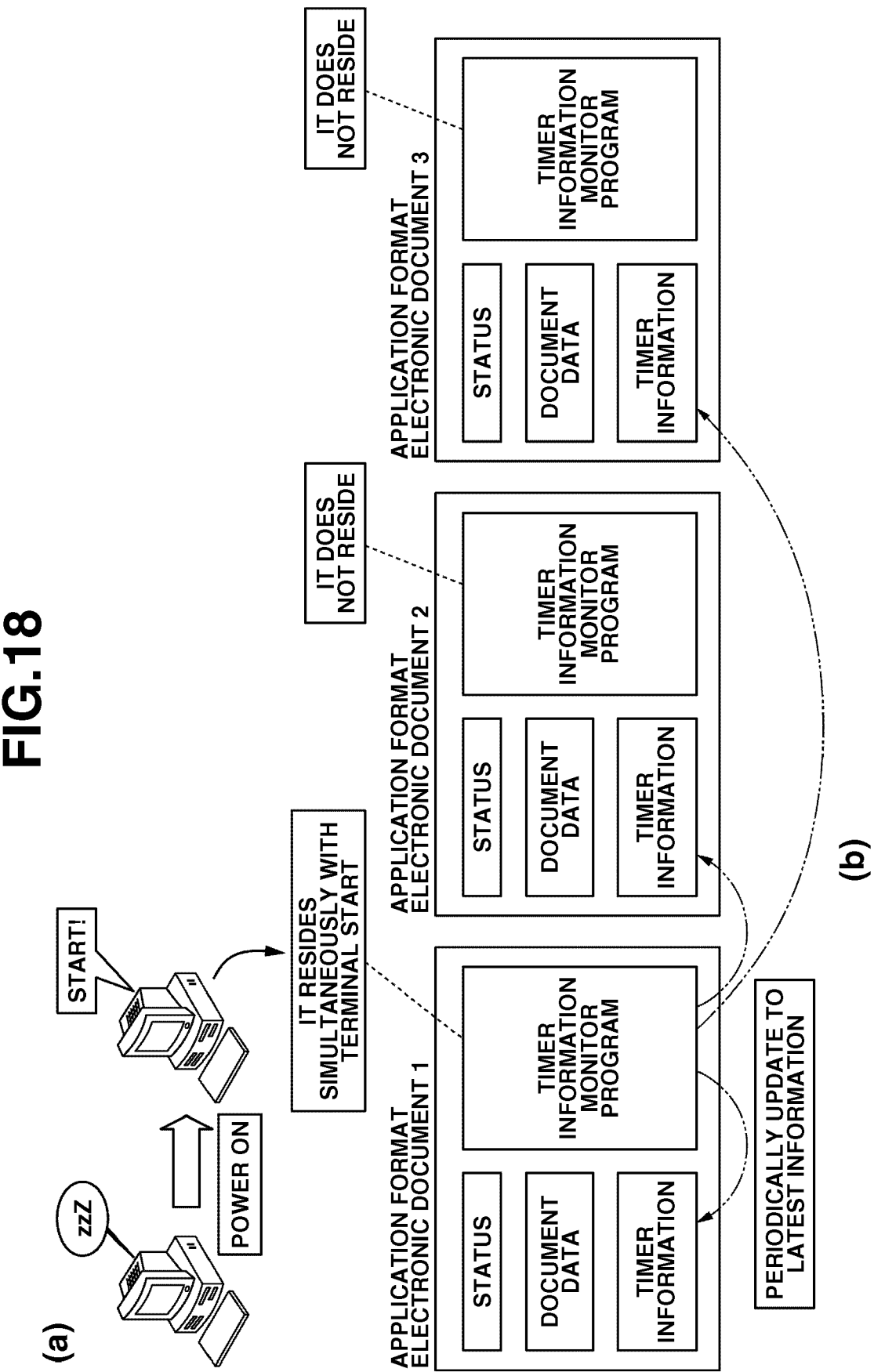

FIG.19

STORAGE MEDIUM SUCH AS FD/CD-ROM

| DIRECTORY INFORMATION |
|---|
| PROGRAM CODE CORRESPONDING TO STEPS OF FLOWCHART SHOWN IN FIG.4 |
| PROGRAM CODE CORRESPONDING TO STEPS OF FLOWCHART SHOWN IN FIG.5 |
| PROGRAM CODE CORRESPONDING TO STEPS OF FLOWCHART SHOWN IN FIG.6 |
| PROGRAM CODE CORRESPONDING TO STEPS OF FLOWCHART SHOWN IN FIG.7 |
| PROGRAM CODE CORRESPONDING TO STEPS OF FLOWCHART SHOWN IN FIG.8 |
| PROGRAM CODE CORRESPONDING TO STEPS OF FLOWCHART SHOWN IN FIG.9 |
| PROGRAM CODE CORRESPONDING TO STEPS OF FLOWCHART SHOWN IN FIG.12 |
| PROGRAM CODE CORRESPONDING TO STEPS OF FLOWCHART SHOWN IN FIG.13 |
| PROGRAM CODE CORRESPONDING TO STEPS OF FLOWCHART SHOWN IN FIG.14 |
| PROGRAM CODE CORRESPONDING TO STEPS OF FLOWCHART SHOWN IN FIG.15 |
| PROGRAM CODE CORRESPONDING TO STEPS OF FLOWCHART SHOWN IN FIG.16 |
| PROGRAM CODE CORRESPONDING TO STEPS OF FLOWCHART SHOWN IN FIG.17 |

MEMORY MAP OF STORAGE MEDIUM

INFORMATION PROCESSING APPARATUS, ELECTRONIC DOCUMENT PROCESSING METHOD, AND STORAGE MEDIUM

BACKGROUND OF THE INVENTION

1. Field of the Invention

The present invention relates to start processing of an electronic document in an information processing apparatus for processing an application format electronic document.

2. Description of the Related Art

Conventionally, for example, as discussed in Japanese Patent Application Laid-Open No. 2001-175511, an expiration date has been set for an electronic document. In the case of limiting an operation such as reading or editing of a document according to the expiration date, an expiration date has been set for the document, and the expiration date has been checked on an application side associated with the document.

In an information processing apparatus discussed in Japanese Patent Application Laid-Open No. 2001-175511, an expiration date is usually checked based on a clock incorporated in the information processing apparatus. Accordingly, by setting back the incorporated clock, access can be made to a document whose term has expired. This makes it difficult to strictly check the expiration date of a document.

SUMMARY OF THE INVENTION

At least one exemplary embodiment of present invention is directed to an information processing apparatus capable of accurately checking an expiration date of an application format electronic document by updating time information of the electronic document itself to be collated with time managed by a system.

Also, at least one exemplary embodiment of the present invention is directed to an information processing apparatus capable of controlling an operation request on content data in an application format electronic document by correcting time information of the electronic document even if the time information is not matched with time managed by a system when the electronic document is obtained to be registered.

According to an aspect of the present invention, an information processing apparatus includes a storage unit configured to store an application format electronic document having a data structure containing content data, time information, and a program for monitoring the time information, and a start unit configured to start the application format electronic document stored in the storage unit. The program contained in the application format electronic document started by the start unit is configured to execute processing for monitoring time information of the application format electronic document According to another aspect of the present invention, an information processing apparatus includes a timer unit configured to clock time, a storage unit configured to store an application format electronic document having a data structure containing content data and a program for monitoring the time clocked by the timer unit, and a start unit configured to start the application format electronic document stored in the storage unit. The program contained in the electronic document started by the start unit executes processing for monitoring time clocked by the timer unit.

According to another aspect of the present invention, a method for controlling an information processing apparatus includes storing an application format electronic document of a data structure containing content data, time information, and a program for monitoring the time information in a storage unit, starting the application format electronic document stored in the storage unit, and causing the program contained in the started application format electronic document to execute processing for monitoring the time information of the application format electronic document.

According to another aspect of the present invention, a method for an information processing apparatus which comprises a timer unit which clocks time and capable of processing an electronic document, includes storing an application format electronic document of a data structure containing content data and a program for monitoring the time clocked by the timer unit in an storage unit, starting the application format electronic document stored in the storage unit, and causing the program contained in the started electronic document to execute processing for monitoring the time clocked by the timer unit.

Accordingly, an expiation date of an application format electronic document can be accurately checked. Furthermore, when the application format electronic document is obtained to be registered, even if time information of the electronic document is not matched with time managed by a system, the time information of the electronic document is corrected to facilitate properly controlling an operation request on document information of the electronic document.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a diagram showing a document reading processing operation in the information processing apparatus according to the first exemplary embodiment.

FIG. 12 is a flowchart showing an example of a data processing procedure in an information processing apparatus according to a third exemplary embodiment of the present invention.

FIG. 18 is a diagram showing start processing of an application format electronic document in the information processing apparatus according to the third exemplary embodiment of the present invention.

FIG. 19 is a diagram showing an example memory map of a storage medium for storing various data processing programs readable by the information processing apparatus according to an exemplary embodiment.

DETAILED DESCRIPTION OF THE EMBODIMENTS

Various exemplary embodiments, features, and aspects of the present invention will be described in detail below with reference to the accompanying drawings.

First Exemplary Embodiment

Figure 1:
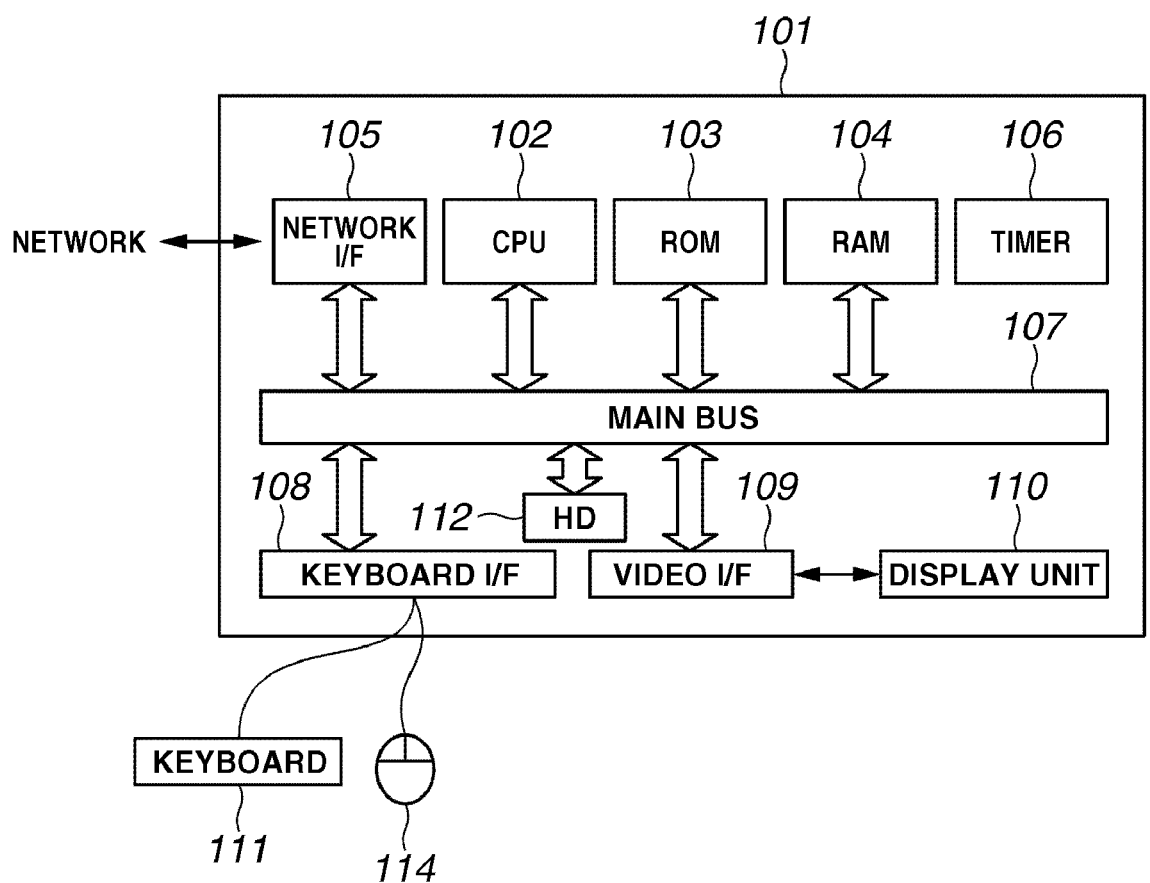
FIG. 1 is a diagram showing an information processing system configuration to which an information processing apparatus according to a first exemplary embodiment of the present invention can be applied.

FIG. 1 is block diagram showing an information processing system configuration to which an information processing apparatus according to a first exemplary embodiment can be applied.

Referring to FIG. 1, a central processing unit (CPU) 102 executes overall control for an information processing apparatus 101 via a main bus 107.

A timer 106 manages system time by counting a reference clock output from a crystal oscillator (not shown). The system time that the timer 106 counts is real time. Alternatively, the system time can be the information that shows the time after information processing apparatus 101 starts. A network interface (I/F) 105 manages inputting/outputting of a network signal between devices connected to a network based on a predetermined protocol.

The CPU 102 processes a signal from an input unit via a keyboard interface (KBD I/F) 108. For example, the CPU 102 performs a series of operations such as image inputting, image processing, color conversion, and image output control according to an instruction input from a keyboard 111 or a pointing device (PD) 114 via the KBD I/F 108.

Additionally, the CPU 102 controls, via a video I/F 109, a display unit 110 for displaying image data input from a device (not shown) via the network I/F 105 or image data generated by using the keyboard 111 or the pointing device 114.

A read-only memory (ROM) 103 stores various control programs for executing various types of control of the CPU 102.

In a random access memory (RAM) 104, other control programs including a control program for realizing an operating system (OS) or functions of the present invention are loaded by the CPU 102 to be executed.

The RAM 104 functions as an area of various works or a temporary area used for executing the control programs.

The RAM 104 includes a video RAM (VRAM) (not shown) for temporarily storing image data input via the network I/F 105 or image data generated by using the keyboard 111 or the pointing device 114.

A hard disk (HD) 112, a compact disk—ROM (CD-ROM) drive, or the like is provided so that various application programs or the OS can be loaded to the RAM 104 via a disk interface (not shown). An application format electronic document of a data structure containing document information, time information, and a program for monitoring the time information is loaded to the RAM 104 from the HD 112 at the time of power-on or the like to reside as a system file. The time information, which the application format electronic document contains, is real time. Alternatively, the time information can be the information, which shows the time after the application format electronic document is executed.

Figure 2:
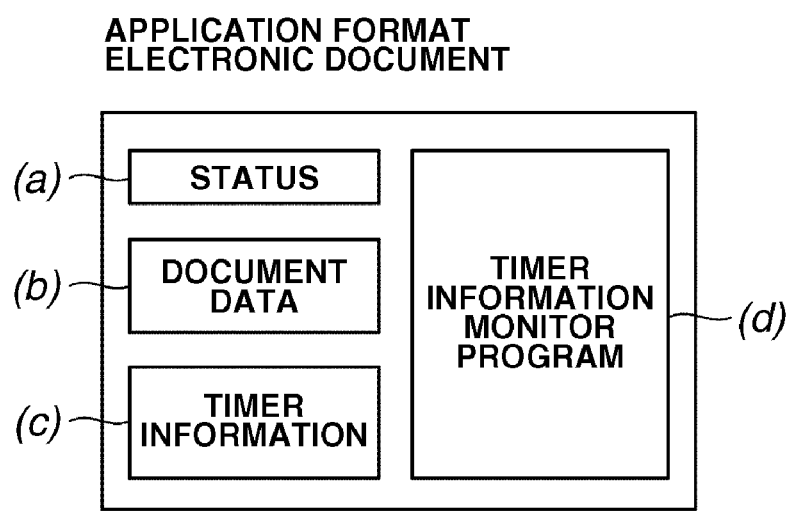
FIG. 2 is a diagram showing a configuration of electronic document information to be processed by the information processing apparatus shown in FIG. 1.

Then, when the application format electronic document is started, matching is executed to synchronize time information clocked by the timer 106 with time information contained in the application format electronic document. Specifically, a timer information monitor program (d) of the application format electronic document shown in FIG. 2 is started to update timer information (c) so that the time information clocked by the timer 106 can be synchronized with the timer information (c).

When the application format electronic document is stored in a nonrewritable storage medium, for example, when it is stored in a CD-ROM or the like, synchronization processing cannot be executed. Accordingly, as long as the time information of the timer 106 matches time information stored in the CD-ROM or the like, the application format electronic document is started. At other timing, the application format electronic document is never started.

The time information of the timer 106 is managed so that accurate time information can be generated by communicating with an external time server (not shown) for managing and providing accurate time information, as described below, via the network I/F 105 according to a predetermined protocol.

In the system example shown in FIG. 1, the HD 112 is shown as an example of a storage medium for storing an application format electronic document. However, various memory devices such as a rewritable memory device, a universal serial bus (USB) memory, a flash memory, and a nonvolatile RAM (NVRAM) can be applied.

FIG. 2 is a diagram showing an example configuration of electronic document information to be processed by the information processing apparatus 101 shown in FIG. 1. According to the first exemplary embodiment, FIG. 2 shows an example of a configuration of an application format electronic document (hereinafter referred to as an "AFED") 200.

Referring to FIG. 2, information (a) of various statuses contains, according to first the exemplary embodiment, information indicating permission/inhibition of reading of document data (b) in the AFED.

An application for editing or reading a document accesses the document data (b). A data structure of the document data (b), e.g., file attributes or the like, may be designed according to the system. As for data (b), it may not be a document, and the image, graphic, movie, or audio is acceptable. Such contents data corresponds to data (b).

Timer information (c) (time information) contains expiration date information of the document data (b) or update information of the timer 106 in the information processing apparatus 101.

The timer information (c) should be encrypted to prevent direct rewriting of a value. The document data (b) may similarly be encrypted or compressed to be managed.

A timer information monitor program (d) periodically updates the timer information (c) in the AFED based on the timer 106 of the information processing apparatus 101. Then, the timer information monitor program (d) checks matching between the timer 106 of the information processing apparatus 101 and the timer information (c) of the AFED.

The timer information monitor program (d) has additional functions of error processing, error prevention processing, and synchronization between the time server and the timer of the information processing apparatus, as shown in flowcharts and described below.

Now, a specific example of an authenticity monitoring operation on the timer 106 of the information processing apparatus using the AFED according to the first exemplary embodiment of the present invention will be described below with reference to FIGS. 3 to 10.

Figure 3:
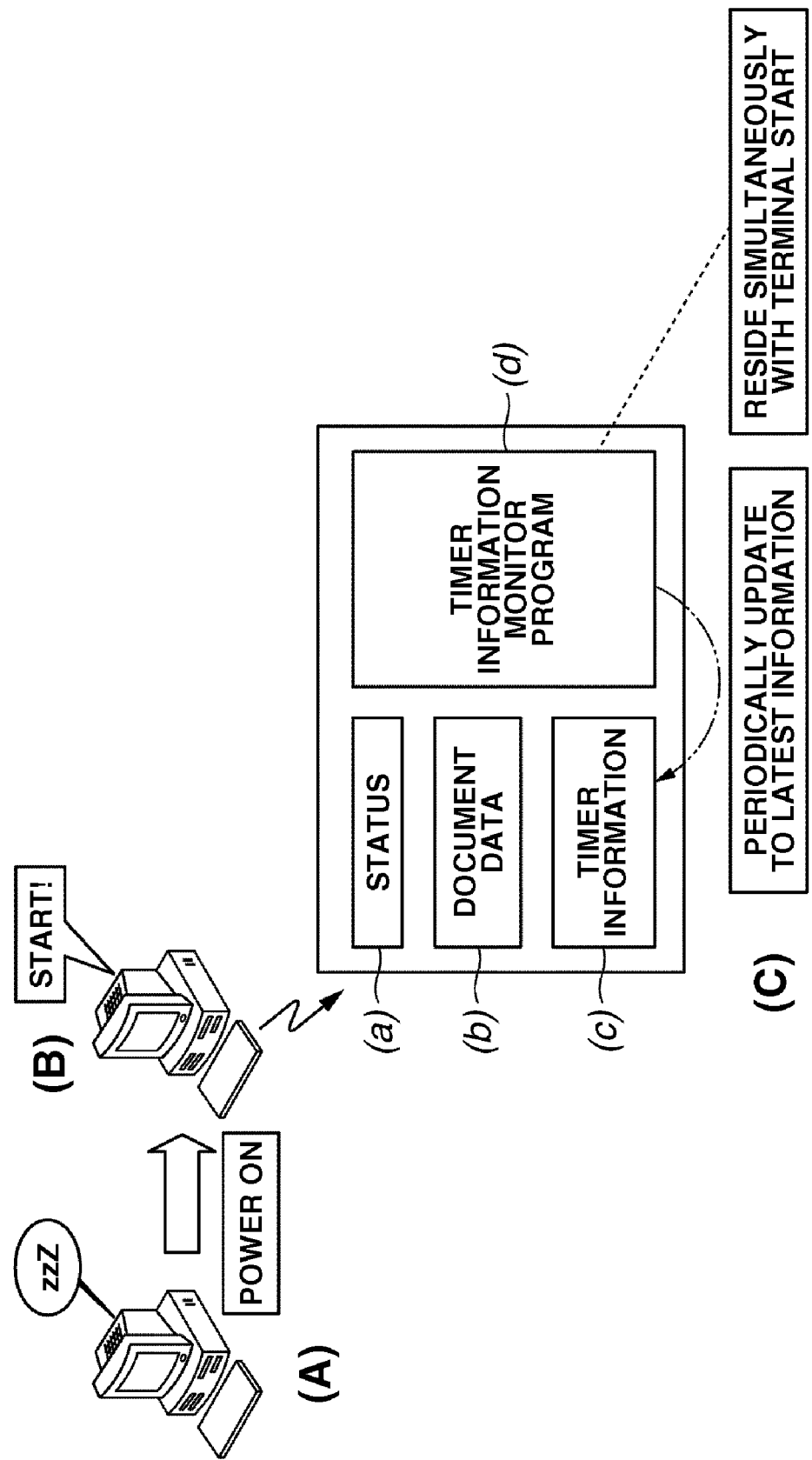
FIG. 3 is a diagram showing a concept of a data processing operation when power is turned on for the information processing apparatus shown in FIG. 1.

FIG. 3 is a diagram showing a concept of a data processing operation at the time of power-on in the information processing apparatus shown in FIG. 1.

Referring to FIG. 3, (A) indicates a sate where power is not on for the information processing apparatus (or terminal). When power is turned on for the terminal in the state (A) of FIG. 3, the state is changed to a start state indicted by (B) of FIG. 3.

Specifically, upon start of the information processing apparatus 101, as indicated by (B) of FIG. 3, the OS of the information processing apparatus 101 starts the AFED. After the AFED has been started under control of the OS, the timer information monitor program (d) of the AFED resides as system resources in the RAM 104 to periodically update the timer information in the AFED to latest information. It should be noted that the AFED is registered as a start file by the OS. When power is turned on, the AFED is loaded from the HD 112 or the like to the RAM 104 to be executed.

The information processing apparatus thus configured includes the following features and functions.

The information processing apparatus is capable of processing an electronic document by a predetermined file system and includes the HD 112 for storing an AFED of a data structure containing the document data (b), the timer information (c), and the program (d) for monitoring the timer information shown in FIG. 2.

The CPU 102 includes a start function of starting the AFED stored in the HD 112 at the time of, e.g., power-on.

When start conditions defined by a relation between the timer 106 and the timer information (c) are satisfied, various operation requests (e.g., data reading, data writing, or the like) can be made to the document data (b).

According to the present exemplary embodiment, as shown in FIG. 1, the timer 106 is provided to clock system time.

The electronic document program (timer information monitor program (d)) started by the CPU 102 updates the time information of the electronic document stored in the HD 112 based on the system time clocked by the timer 106 and the time information stored in the electronic document.

The electronic document program started by the CPU 102 determines matching between the system time clocked by the timer 106 and the time information stored in the electronic document.

Upon determination that the system time clocked by the timer 106 is not matched with the time information stored in the electronic document, the electronic document program started by the CPU 102 executes predetermined error processing.

In the predetermined error processing, the CPU 102 adds limit information (status (a) shown in FIG. 2) of operation requests for the document information of the electronic document to the electronic document as described below.

The operation requests include requests of all operations executed for the document file by normally operating a personal computer, such as a reading operation request for document information of the electronic document, and a writing operation request for the document information of the electronic document.

The timer information monitor program (d) has a synchronization determination function of determining whether synchronization processing between the time obtained from the external time server (TS in FIG. 11B) and the timer 106 has been successful. The timer monitor program (d) has a correction function of correcting the time information (timer information (c)) of the electronic document to be correct time when the synchronization processing is determined to have been successful.

Accordingly, authenticity of the time information clocked by the timer 106 of the information processing apparatus 101 can be secured.

When the synchronization determination function determines that the synchronization processing has not been successful, predetermined error processing is carried out.

Figure 8:
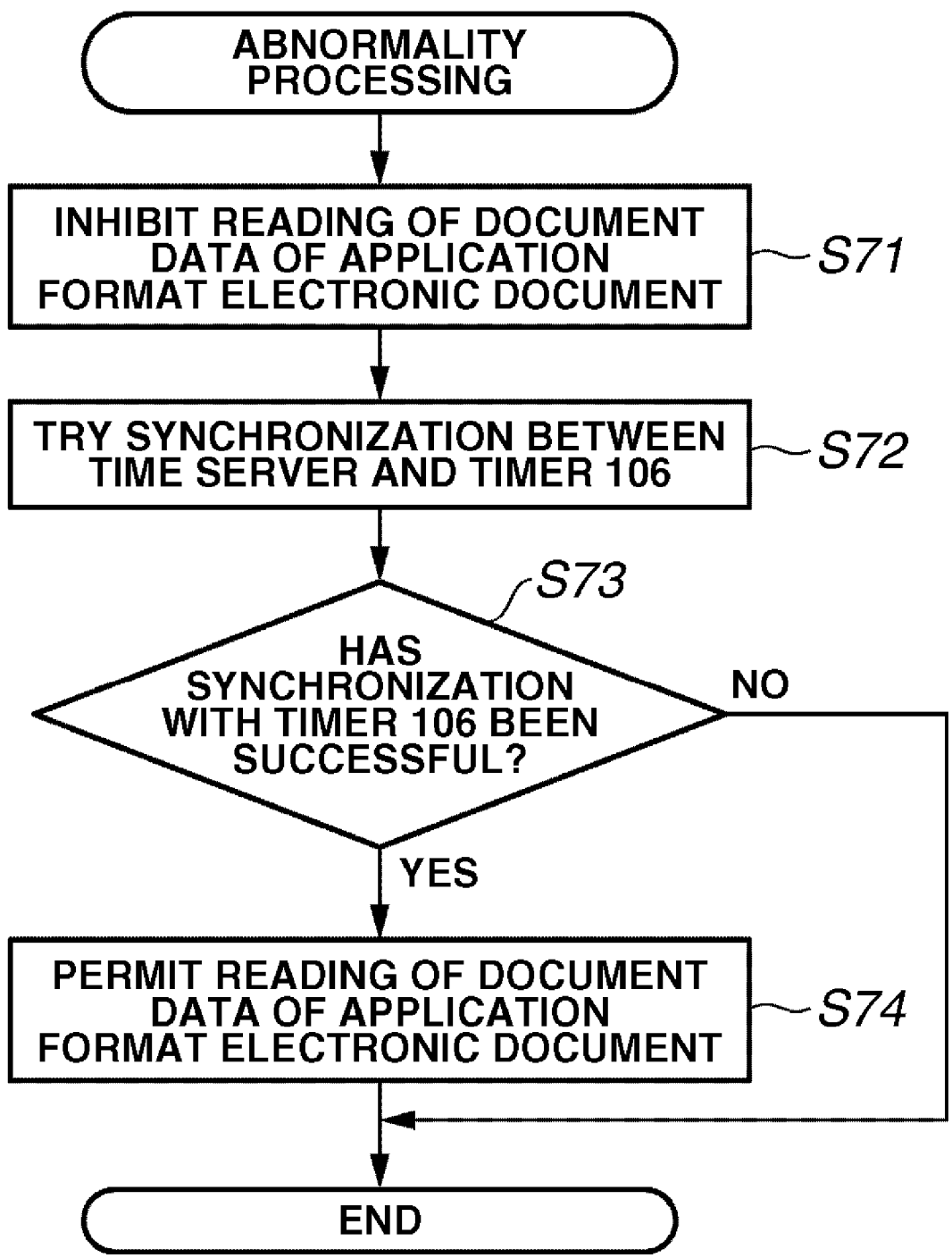
FIG. 8 is a flowchart showing an example of another data processing procedure in the information processing apparatus according to the first exemplary embodiment.

The predetermined error processing includes processing for setting a status of the document data (b) of the AFED to permission of reading when synchronization is determined to have been successful, for example, as shown in FIG. 8.

The CPU 102 automatically starts the AFED when the information processing apparatus 101 is started or predetermined login is executed.

Thus, the AFED is started at proper time to enable necessary update processing of the timer information.

The CPU 102 executes one or both of reading and saving operations for one or both of the document information (document data (b)) and the time information (timer information (c)) of the electronic document.

Additionally, the CPU 102 has a registration function to enable the information processing apparatus 101 to register an electronic document of a reading permitted state obtained from another data processing apparatus (not shown) in the HD 112. The registration function is equivalent to a normal document file copying or moving function. The CPU 102 further has a copied document determination function to determine whether time information of the electronic document registered by the registration function and the time information clocked by the timer 106 are correct.

When the copied document determination function determines that the time information is not correct, the CPU 102 sets a status (a) of an operation request of the registered document to a reading inhibited state so that reading of document data of the electronic document can be limited.

The CPU 102 further has a registered document determination function to determine whether the time information of the electronic document registered in the HD 112 and the time information clocked by the timer 106 are correct. When the registered document determination function determines that the time information is not correct, the CPU 102 corrects the time information of the electronic document to correct time.

Accordingly, the AFED obtained from another information processing apparatus is registered in the HD 112. Subsequently, matching is executed to synchronize pieces of time information with each other even when the electronic document is copied in the HD 112 in an unmatched state between the timer information (c) of the electronic document and the time information clocked by the timer 106 of the information processing apparatus. Specifically, after the time correction by the correction function of the CPU 112, limit information set in the electronic document is released to change the electronic document to a reading permitted state. Thus, the status (a) set to a reading inhibition sate during the registration is changed to a reading permitted state to enable reception of an operation request for the copied AFED.

Figure 4:
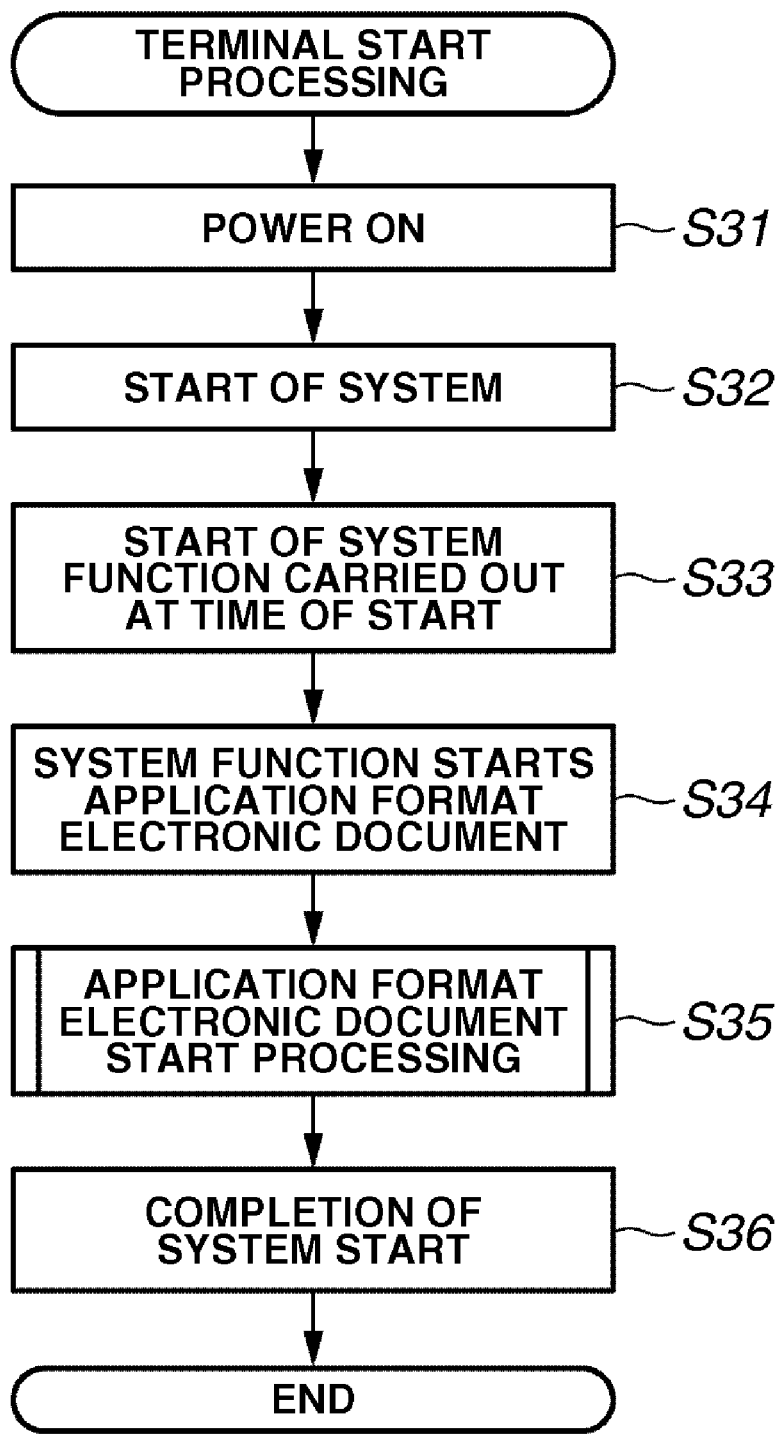
FIG. 4 is a flowchart showing an example of a data processing procedure in the information processing apparatus according to the first exemplary embodiment.

FIG. 4 is a flowchart showing an example of a data processing procedure in the information processing apparatus according to the first exemplary embodiment. This example corresponds to a terminal processing procedure at the time of power-on of the information processing apparatus 101. Each step is implemented by loading a control program loaded from the ROM 103 or an external storage apparatus (not shown) to the RAM 104 to execute it by the CPU 102 shown in FIG. 1.

Figure 5:
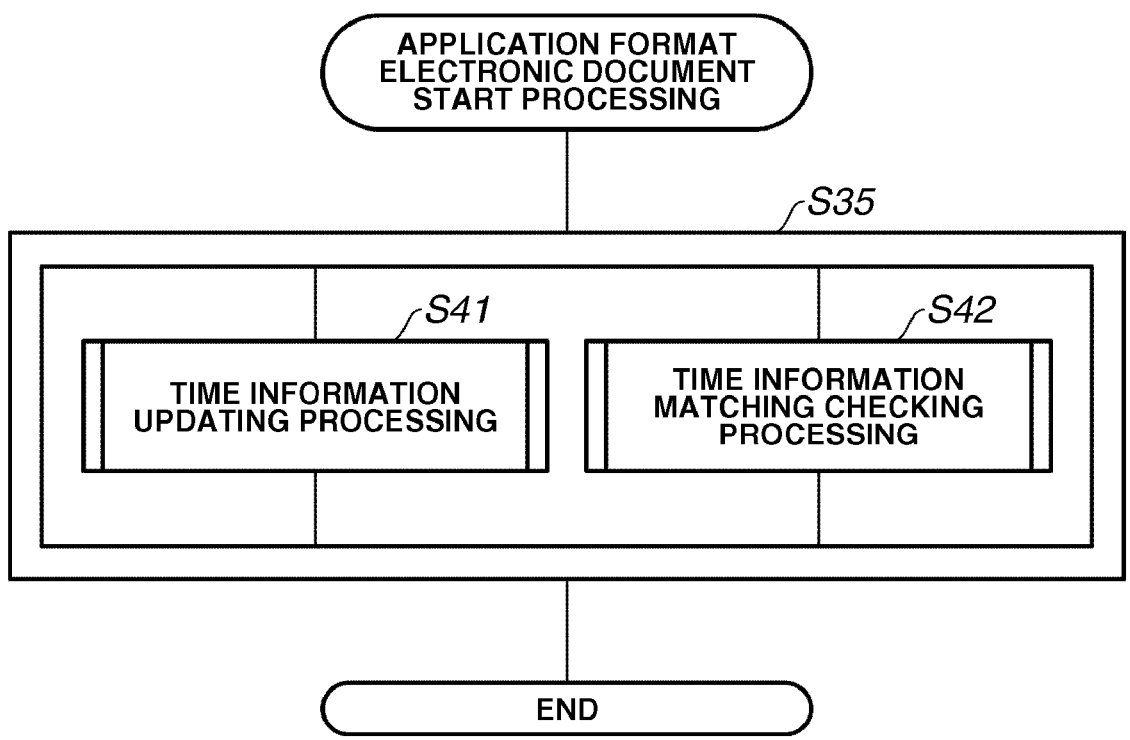
FIG. 5 is a flowchart showing an example of another data processing procedure in the information processing apparatus according to the first exemplary embodiment.

First, in step S31, power is turned on, for example, a user operates a switch to turn power on for the terminal. Then, in step S32, a system program of the OS or the like is loaded to the RAM 104 to be started. In step S33, system function processing of the information processing apparatus 101 executed at the time of start is started. In step S34, if there is an AFED stored to be started in the HD 112, the start of the AFED is instructed. Then, in step S35, start processing of the AFED is executed. Details of the AFED start processing in step S35 are shown in FIG. 5 and described below. In step S36, the system start is completed to finish this processing.

The start condition of the electronic document may be when the information processing apparatus 101 executes logon processing or when the system recovers from a sleep state as well as when the power is turned on.

FIG. 5 is a flowchart showing an example of another data processing procedure in the information processing apparatus according to the first exemplary embodiment. This flowchart corresponds to step S35 in FIG. 4. Each step is implemented by loading a control program loaded from the ROM 103 or an external storage apparatus (not shown) to the RAM 104 to execute it by the CPU 102 shown in FIG. 1.

Figure 6:
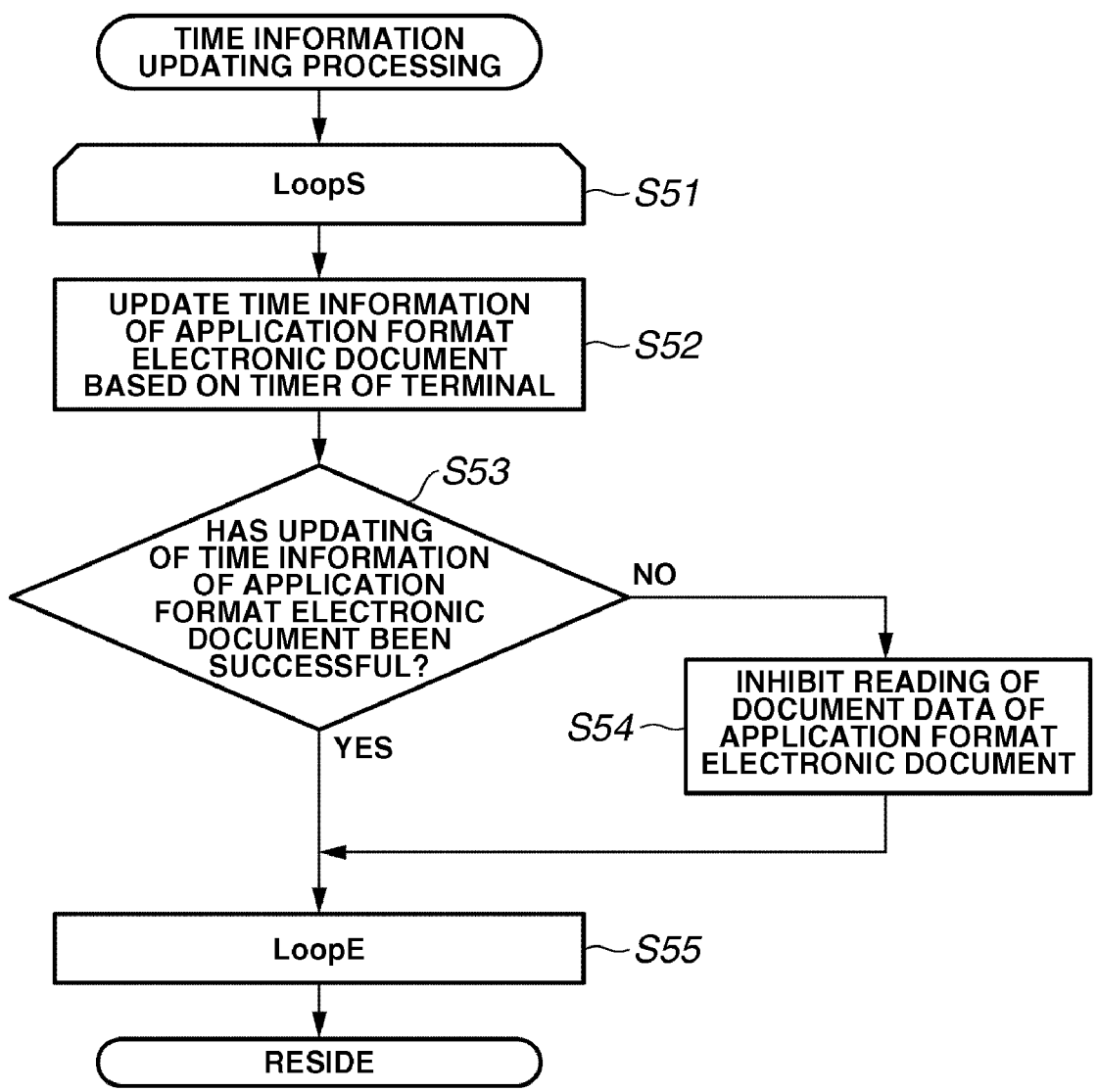
FIG. 6 is a flowchart showing an example of another data processing procedure in the information processing apparatus according to the first exemplary embodiment.
Figure 7:
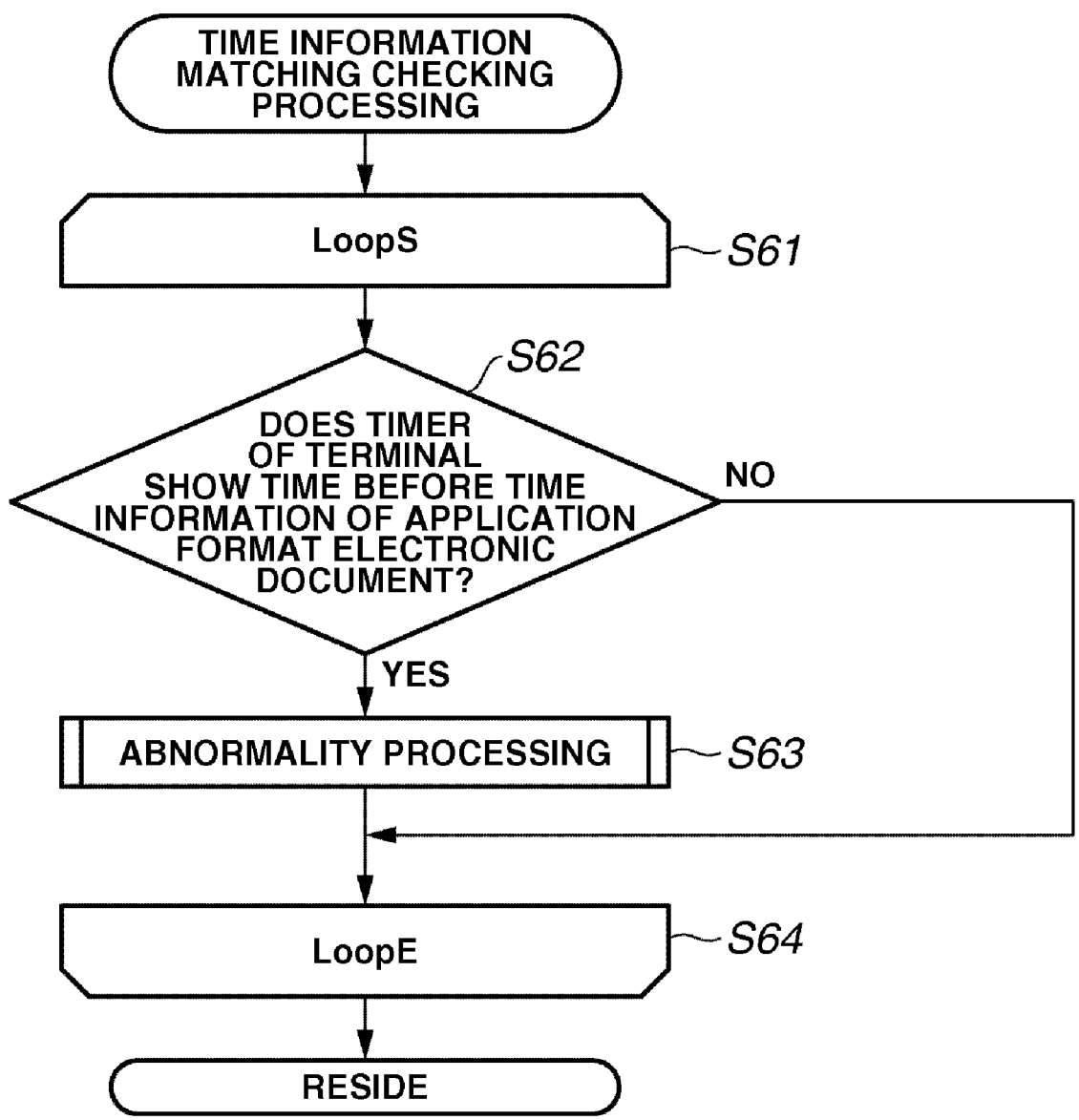
FIG. 7 is a flowchart showing an example of another data processing procedure in the information processing apparatus according to the first exemplary embodiment.

First, in step S41, time information updating processing is executed. Exemplary time information updating processing (step S41) is shown in FIG. 6 and is described below. In parallel with this step, in step S42, time information matching checking processing is executed to finish the processing. Exemplary time information matching checking processing (step S42) is shown in FIG. 7 and is described below. The steps S41 and S42 may be sequentially executed. For example, the step S42 may be executed first, and then step S41 may be executed.

FIG. 6 is a flowchart showing an example of another data processing procedure in the information processing apparatus according to the first exemplary embodiment. This example corresponds to a time information updating processing procedure of the information processing apparatus. Each step is implemented by loading a control program loaded from the ROM 103 or an external storage apparatus to the RAM 104 to execute it by the CPU 102 shown in FIG. 1.

First, in step S51, loop processing (LoopS) is started. In step S52, the timer information (c) of the AFED is updated based on the time information clocked by the timer 106 of the information processing apparatus 101. Then, in step S53, a determination is made as to whether updating of the timer information (c) of the AFED has been successful. If the updating is determined to have been successful, the process proceeds to loop processing (LoopE) (step S55), and resides in the RAM 104 until reception of a certain finish notification to continue the loop processing.

On the other hand, if it is determined in step S53 that the updating of the timer information (c) of the AFED has not been successful, a status of the document data of the AFED is set to inhibition of reading in step S54. Then, the process proceeds to step S55.

In this case, for example, when the storage apparatus that has stored the electronic document is a rewritable medium, such as a hard disk, the time information of the electronic document is updated to be synchronized with the time information clocked by the timer. Accordingly, it is possible to make an operation request on the document information of the electronic document, such as a document information reading or writing operation request.

On the other hand, for example, when the storage apparatus that has stored the electronic document is a nonrewritable medium, such as a CD-ROM, the time information of the electronic document cannot be updated. In this case, it is determined in step S53 that the updating has not been successful. Thus, a start of the electronic document can be limited.

FIG. 7 is a flowchart showing an example of another data processing procedure in the information processing apparatus according to the first exemplary embodiment. This example corresponds to a time information matching checking processing procedure of the information processing apparatus. Each step is implemented by loading a control program loaded from the ROM 103 or an external storage apparatus (not shown) to the RAM 104 to execute it by the CPU 102 shown in FIG. 1.

First, in step S61, loop processing (LoopS) is started. In step S62, a determination is made as to whether the timer 106 of the terminal shows time before the timer information (c) of the AFED. If it is determined that the timer 106 of the terminal does not show time before the timer information (c) of the AFED, the process proceeds to loop processing (LoopE) in step S64, and resides in the RAM 104 until reception of a certain finish notification to continue the loop processing.

On the other hand, if it is determined in step S62 that the timer 106 of the terminal shows time before the timer information (c) of the AFED, abnormality processing is carried out in step S63. An example of abnormality processing (step S63) is shown in FIG. 8 and is described below. Then, the process proceeds to the step S64.

FIG. 8 is a flowchart showing an example of another data processing procedure in the information processing apparatus according to the first exemplary embodiment. This example corresponds to the abnormality processing procedure 63 of the information processing apparatus. Each step is implemented by loading a control program loaded from the ROM 103 or an external storage apparatus to the RAM 104 to execute it by the CPU 102 shown in FIG. 1.

First, in step S71, a status of the document data of the AFED is set to inhibition of reading. In step S72, synchronization is tried between a reliable external time server (time server TS in FIG. 11B) and the timer of the terminal. Then, in step S73, a determination is made as to whether the synchronization of the timer 106 has been successful. If it is determined that the synchronization has not been successful, this processing ends.

On the other hand, if it is determined in step S73 that the synchronization has been successful, the status of the document data (b) of the AFED is set to permission of reading in step S74. Then, the processing ends.

Figure 9:
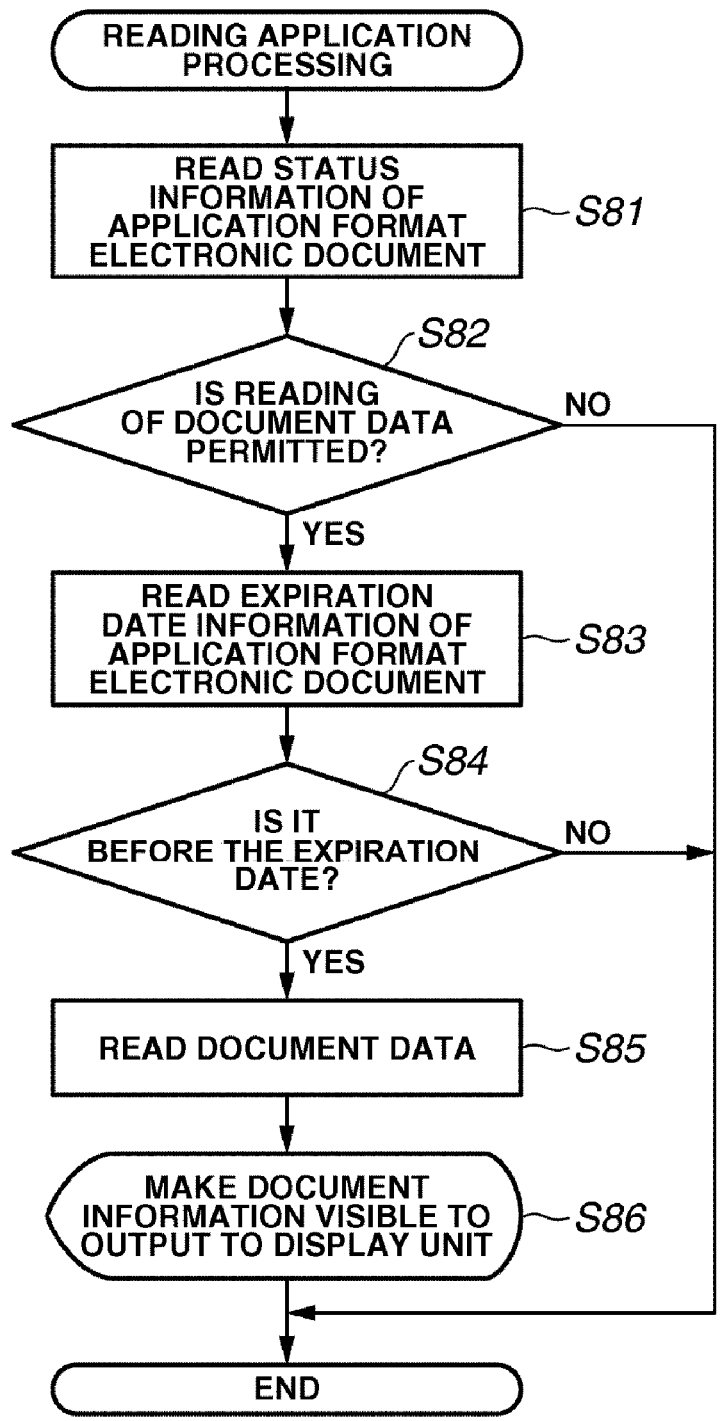
FIG. 9 is a flowchart showing an example of another data processing procedure in the information processing apparatus according to the first exemplary embodiment.

FIG. 9 is a flowchart showing an example of another data processing procedure in the information processing apparatus according to the first exemplary embodiment. This example corresponds to a reading application processing procedure for reading the AFED in the information processing apparatus. Each step is implemented by loading a control program loaded from the ROM 103 or an external storage apparatus (not shown) to the RAM 104 to execute it by the CPU 102 shown in FIG. 1. The CPU 102 executes the process of this flowchart in response to the user of the information processing apparatus instructing reading of the AFED.

The process of this flowchart is started in response to an operation of accessing the AFED stored in the HD 112 using a reading application installed in the information processing apparatus 101. First, in step S81, status information (a) of the AFED to be operated is read. In step S82, a determination is made as to whether reading of the document data is permitted. If the reading is determined to be inhibited (i.e., not permitted), this processing ends.

On the other hand, if the reading is determined to be permitted in step S82, in step S83, expiration date information of the AFED is read. In step S84, a determination is made as to whether the AFED is before the expiration date. If the AFED is determined not to be before the expiration date, this processing ends without executing processing for reading.

On the other hand, if the AFED is determined to be before the expiration date in step S84, the document data (b) of the AFED is read in step S85. Then, in step S86, the CPU 102 makes the document information visible and outputs it to the display unit 110 via the video interface 109. Then, the process ends.

The determination in step S84 as to whether the AFED is before the expiration date is made based on a result of comparison of the expiration date information contained in the timer information (c) of the AFED with current time indicated by the timer 106. Alternatively, the determination may be made based on a comparison of the expiration date information contained in the timer information (c) of the AFED with the time information.

The operation on the AFED has been described by taking the reading operation in FIG. 9 as an example. However, the invention can be applied to other operations (such as editing, printing, and file copying or moving). In this case, the processing in step S86 is changed according to operation contents.

FIG. 10 is a diagram showing an example of a document reading processing operation in the information processing apparatus according to the first exemplary embodiment. Referring to FIG. 10, an example of a timer authenticity checking processing operation in the information processing apparatus 101 will be described.

State (a) in FIG. 10 shows a state of the AFED at real time of "10:00:000".

State (b) in FIG. 10 shows a state of the AFED at real time of "10:05:000".

It is presumed that at the time "10:00:000" the timer 106 of the terminal is reliable having been synchronized with, e.g., a reliable time server.

At this time, regarding the AFED, if matching between the time information of the AFED and the timer 106 of the terminal is checked, the status of the AFED is kept to be permission of reading as no mismatching occurs. Accordingly, the reading application loaded to the RAM 104 can access the document data of the AFED.

However, it is presumed that while real time is "10:05:000", a certain illegal timer operation is executed by user's instruction, and the timer 106 of the terminal is changed to time of, e.g., "9:00:000". Accordingly, regarding the AFED, when matching is checked between the timer information (c) of the AFED and the timer 106 of the terminal, mismatching occurs. Thus, the timer information monitor program (d) of the AFED changes the status (a) of the AFED to inhibition of reading.

In this state, the reading application cannot access the document data (b) of the AFED. Thus, reading is inhibited.

Subsequently, the abnormality processing shown in FIG. 8 is carried out, and the information processing apparatus 101 synchronizes the timer 106 with the timer server again. When the time of the timer 106 is corrected to original correct time, the status (a) of the AFED is changed to permission of reading again.

With the first exemplary embodiment configured as described above, authenticity of time intended by a document creator can be secured.

Second Exemplary Embodiment

Figure 11A:
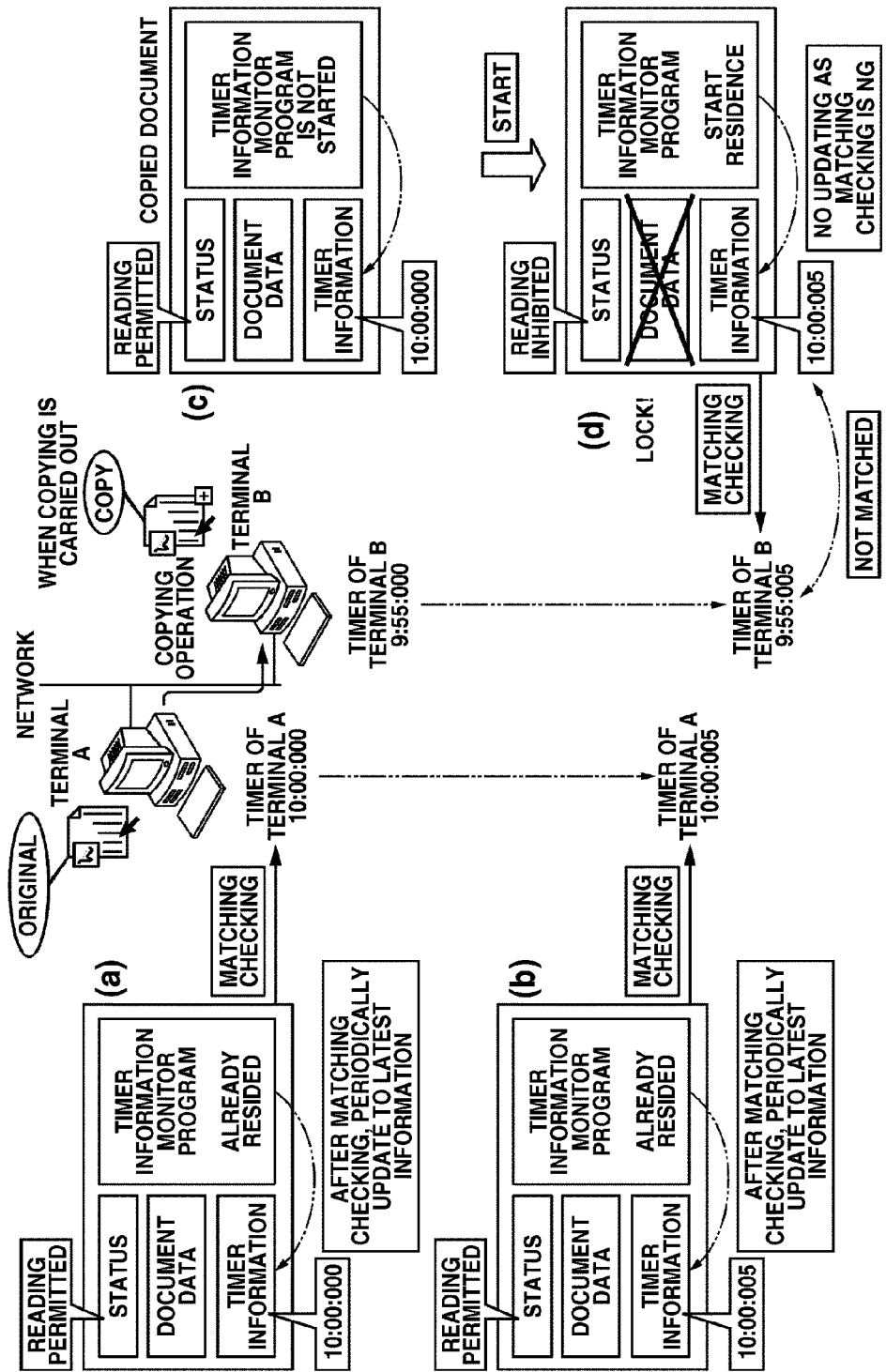
FIG. 11A is a diagram showing a document reading processing state in an information processing apparatus according to a second exemplary embodiment of the present invention.
Figure 11B:
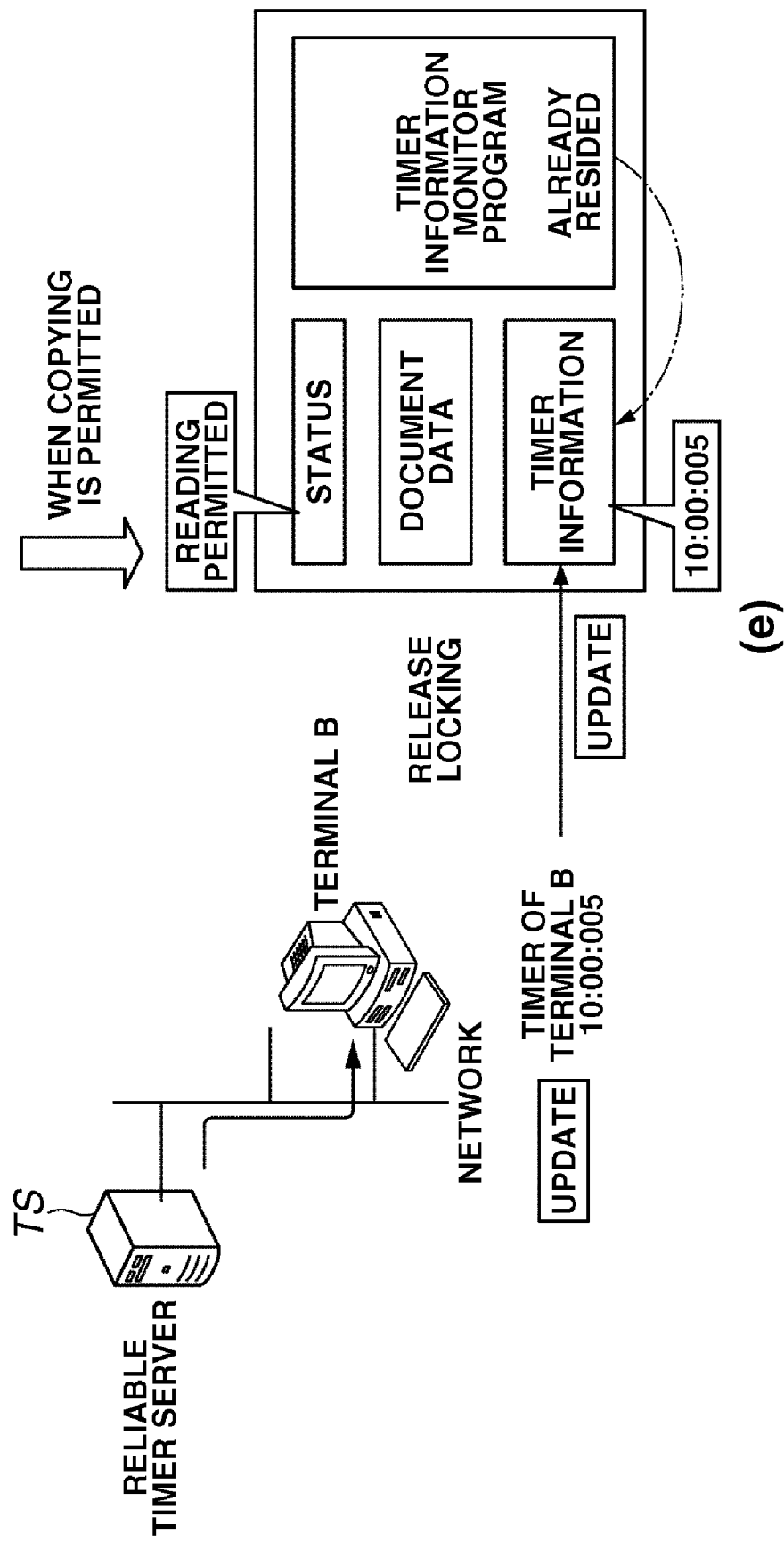
FIG. 11B is a diagram showing the document reading processing state in the information processing apparatus according to the second exemplary embodiment of the present invention.

FIGS. 11A and 11B are diagrams of document reading processing states in an information processing apparatus according to a second exemplary embodiment of the present invention. The examples correspond to operation states during copying processing in an AFED.

States (a) and (c) in FIG. 11A show states of the AFED at real time of "10:00:000". States (b) and (d) in FIG. 11A and state (e) in FIG. 11B show states of the AFED at real time of "10:00:005".

The second exemplary embodiment will be described by taking, as an example, processing when an original AFED present in a terminal A is copied to a terminal B via a network. The terminals A and B are similar in hardware configuration to the information processing apparatus 101 in the first exemplary embodiment.

It is presumed that a timer 106 of the terminal A is not shifted from real time while a timer of the terminal B is shifted from real time (delayed by 5 minutes from real time).

The original (AFED) present in the terminal A has resided in a RAM 104. At time of "10:00:000", as indicated by state (a) in FIG. 11A, there is no problem in matching of time information, and a status of the document indicates permission of reading.

For the original present in the terminal A, at time of "10:00:005", as indicated by state (b) in FIG. 11A, there is no problem in matching of time information, and a status of the document indicates permission of reading.

On the other hand, the AFED copied from the terminal A to the terminal B (hereinafter referred to as a "copied document") is in a state where a timer information monitor program (d) of the copied document has not been started as indicated by state (c) in FIG. 11A. Accordingly, timer information (d) of the copied document is kept at time of copying (10:00:000).

At real time of "10:00:005", for example, when a user starts the copied document, the timer information monitor program (d) of the copied document is actuated to start residing.

When the timer information monitor program (d) of the copied document checks matching between the timer information (c) of the copied document and a timer 106 of the terminal B, the timer 106 of the terminal B is real time of "9:55:005". Accordingly, as mismatching occurs, as indicated by state (d) in FIG. 11A, a status (a) of the copied document is set to inhibition of reading. Conversely, when the timer 106 of the terminal B is ahead of real time, it is not necessary to set the status (a) to inhibition of reading. It is because when the timer 106 is ahead of the real time, ill-use to extend time until an expiration date of the AFED is not possible. Thus, when the timer 106 is not correct, especially when the timer 106 is delayed from the real time, by adding reading of the AFED, it is possible to accurately manage the expiration date of the AFED.

On the other hand, when copying of the AFED is permitted, the timer information monitor program (d) of the copied document tries synchronization between a reliable timer server TS and the timer 106 of the terminal B by a predetermined protocol from the state indicated by (d) in FIG. 11A to the state indicated by (e) in FIG. 11B. Then, when the timer 106 of the terminal B is correctly updated, the timer information (c) of the copied document is updated, and the status (a) is changed to permission of reading.

Accordingly, reading locking is released to change a document copied to the terminal B to a normally readable state.

With the second exemplary embodiment configured as described above, even when an AFED is copied to another information processing apparatus, authenticity of time intended by a document creator can be secured.

Third Exemplary Embodiment

Referring to FIGS. 12 to 18, an operation when a plurality of AFEDs are stored in an HD 112 or the like of an information processing apparatus 101 will be described.

When there are a plurality of AFEDs in the information processing apparatus 101, all of the AFEDs may reside in a system. In such a case, however, resources (RAM 104 and the like) of the system are greatly consumed.

To solve this problem, according to a third exemplary embodiment, when a plurality of AFEDs are present in the information processing apparatus 101, one or some AFEDs reside in the system and manage statuses and timer information of the remaining nonresident AFEDs.

The third exemplary embodiment will be described by taking, as an example, a case where only one AFED resides in the system while a plurality of AFEDs are present in the information processing apparatus 101.

FIG. 12 is a flowchart showing an example of a data processing procedure in the information processing apparatus according to the third exemplary embodiment. This example corresponds to a processing procedure at the time of power-on for the terminal of the information processing apparatus. Each step is implemented by loading a control program from the ROM 103 or an external storage apparatus (not shown) to execute it by the CPU 102 shown in FIG. 1.

First, in step S121, power is turned on for the terminal. In step S122, the system is started under control of the OS. In step S123, a system function executed at the time of the start is started. Then, in step S124, a loop is started (LoopS) until all of the AFEDs are started. In step S125, a determination is made as to whether a first AFED has been started. If the first AFED is determined to have been started, the process proceeds to step S126.

Figure 13:
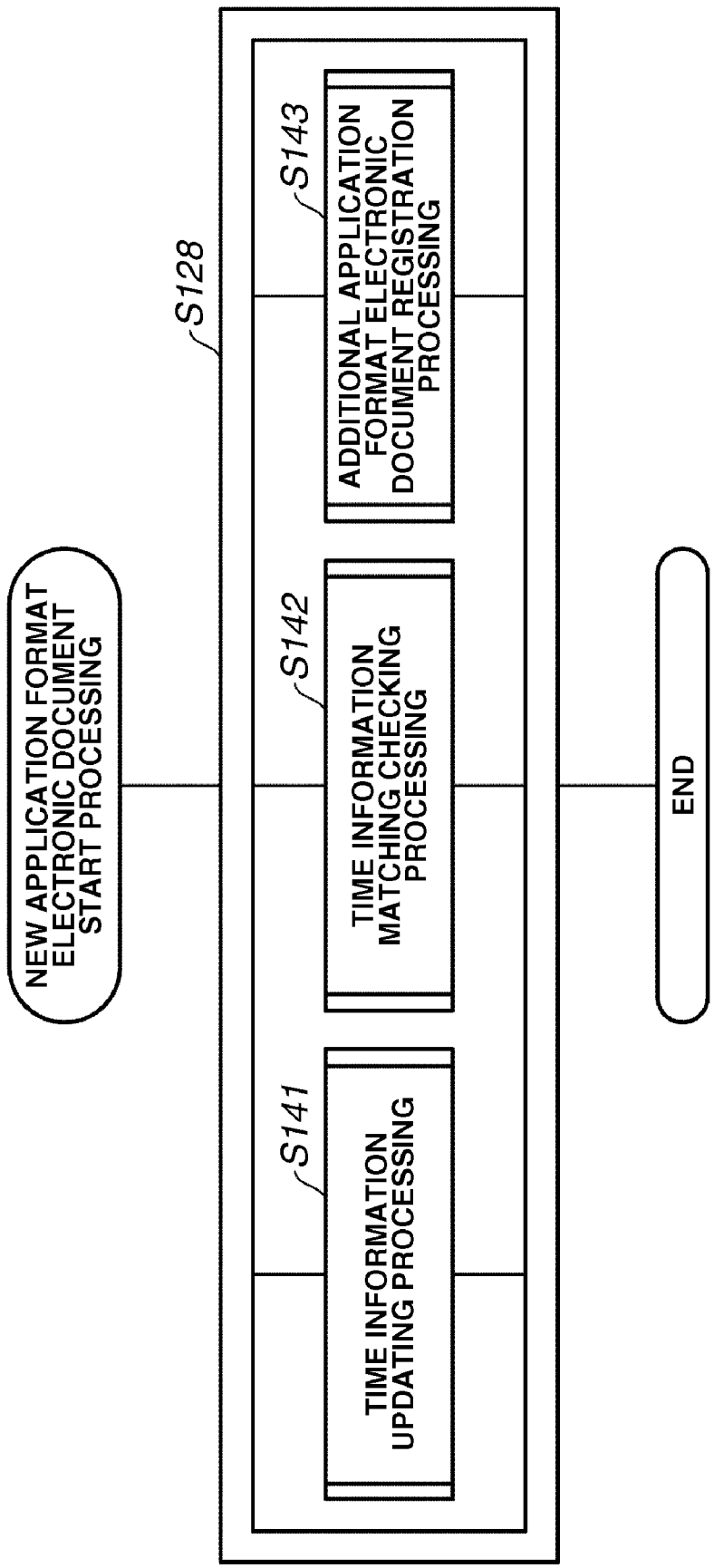
FIG. 13 is a flowchart showing an example of another data processing procedure in the information processing apparatus according to the third exemplary embodiment.

In step S126, the OS starts the AFED. In step S128, new AFED start processing is carried out. Exemplary processing for new AFED start processing (step S128) is shown in FIG. 13 and is described later.

In step S130, the loop started in step S124 ends (LoopE).

Figure 17:
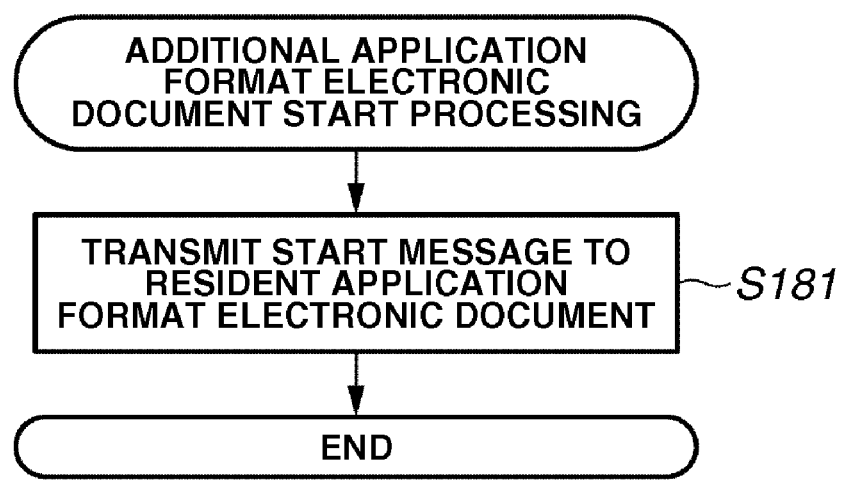
FIG. 17 is a flowchart showing an example of another data processing procedure in the information processing apparatus according to the third exemplary embodiment.

On the other hand, if it is determined in step S125 that the first AFED has not been started, a second or later AFED is started in step S127. Additional AFED start processing is carried out in step S129. Exemplary processing for additional AFED start processing (step S129) is shown in FIG. 17 and is described later. Then, the process proceeds to step S130.

The processing from the LoopS in step S125 to the LoopE in step S130 is repeated until all of the AFEDs stored in the HD 112 or the like of the information processing apparatus 101 are started. Upon completion of the start of all of the AFEDs, the process exits from the loop to proceed to step S131, where the start of the system is completed. Then, the process ends.

Accordingly, each AFED is started, and collation processing is carried out between the timer information of each AFED and the timer information of the terminal. If correct, a status of each AFED is set to permission of reading.

FIG. 13 is a flowchart showing an example of another data processing procedure in the information processing apparatus according to the third exemplary embodiment. This example corresponds to the new AFED start processing procedure in step S128 of FIG. 12. Each step is implemented by loading a control program loaded from the ROM 103 or an external storage apparatus to the RAM 104 to execute it by the CPU 102 shown in FIG. 1.

Figure 14:
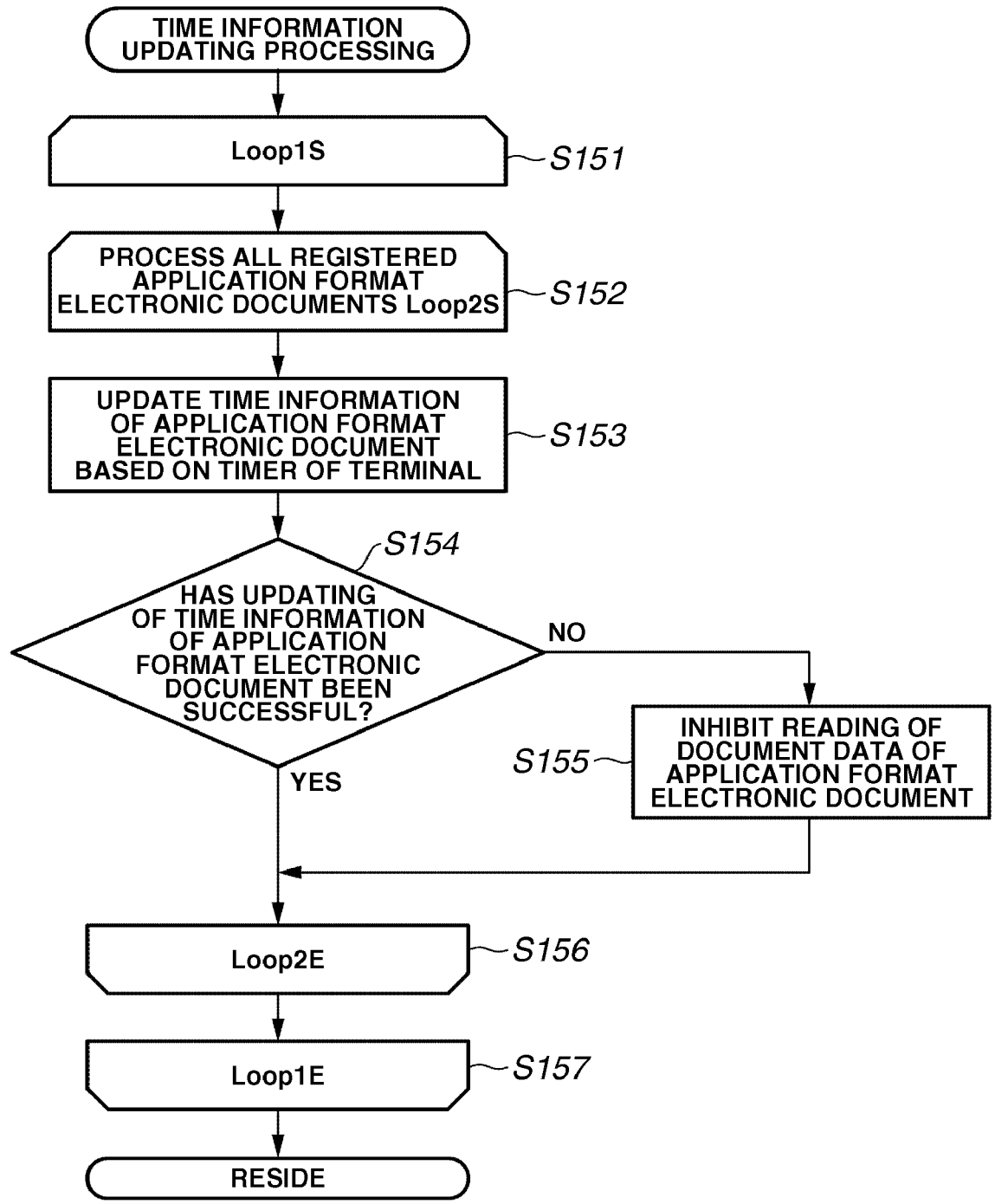
FIG. 14 is a flowchart showing an example of another data processing procedure in the information processing apparatus according to the third exemplary embodiment.
Figure 15:
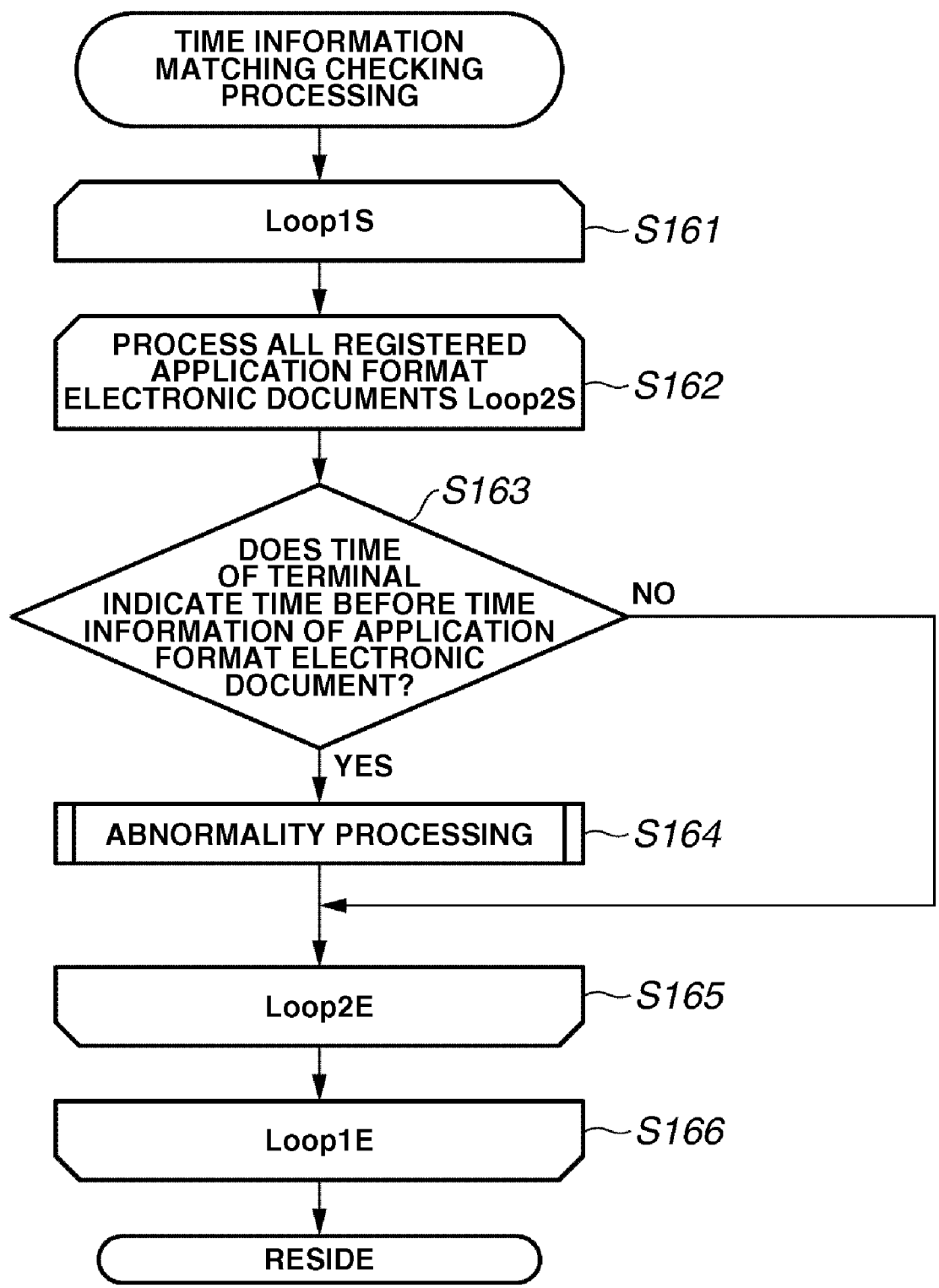
FIG. 15 is a flowchart showing another data processing procedure in the information processing apparatus according to the third exemplary embodiment.
Figure 16:
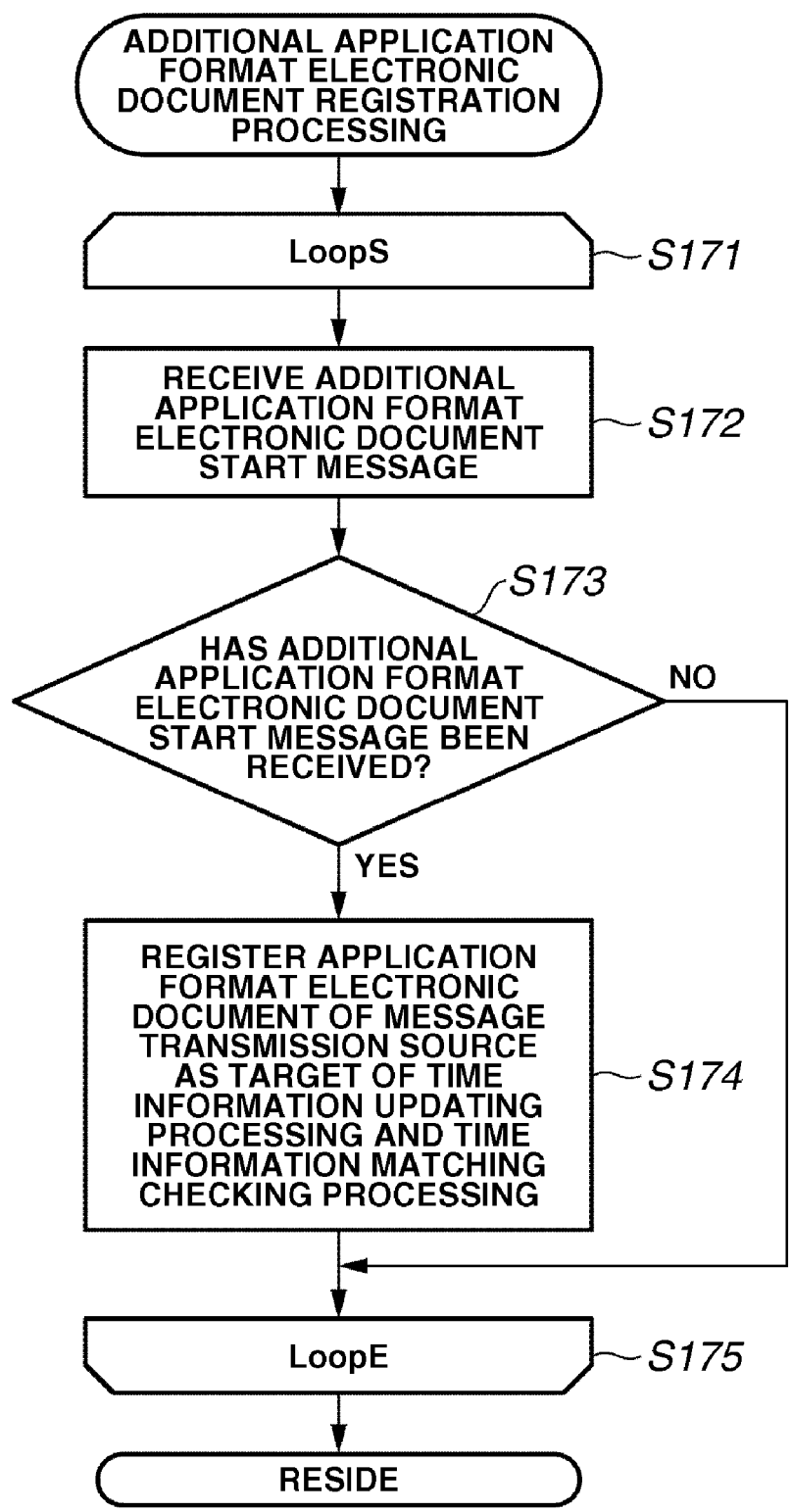
FIG. 16 is a flowchart showing an example of another data processing procedure in the information processing apparatus according to the third exemplary embodiment.

First, in step S141, time information updating processing is executed. Exemplary time information updating processing (step S141) is shown in FIG. 14 and is described below. In step S142, time information matching checking processing is executed. Exemplary time information matching checking processing (step S142) is shown in FIG. 15 and is described later. In step S143, additional AFED registration processing is executed. Exemplary additional AFED registration processing (step S143) is shown in FIG. 16 and is described later. Then, the process ends.

Steps S141 to S143 are executed in parallel. However, these steps may be sequentially executed.

FIG. 14 is a flowchart showing an example of another data processing procedure in the information processing apparatus according to the third exemplary embodiment. This flowchart corresponds to the time information updating processing in step S141 of FIG. 13. Each step is implemented by loading a control program loaded from the ROM 103 or an external storage apparatus to the RAM 104 to execute it by the CPU 102 shown in FIG. 1.

The process of this flowchart is similar to the time information updating processing shown in FIG. 6, but different from FIG. 6 in that a number of loops corresponding to a plurality of AFEDs are repeated.

First, in step S151, a loop L1 is started (Loop1S) In step S152, a loop is started to continue execution until processing is completed for all of the AFEDs registered in step S143 of FIG. 13 (Loop2S). Then, in step S153, timer information (c) of the AFED is updated based on time information clocked by the timer 106 of the terminal. In step S154, a determination is made as to whether the updating of the time information of the AFED has been successful. If successful, a loop from the Loop2S in step S152 to Loop2E in step S156 is repeatedly executed until all of the registered AFEDs have been processed. Upon completion of the processing for all of the AFEDs, the process exits from the Loop 2E in step S156. Then, until reception of a certain end notification, the process resides in the RAM 104 to repeat the loop from the Loop1S in step S151 to Loop1E in step S157.

On the other hand, if the updating is determined to have been unsuccessful in step S154, a status of the document data of the AFED is set to inhibition of reading in step S155. Then, the process proceeds to step S156.

FIG. 15 is a flowchart showing an example of another data processing procedure in the information processing apparatus according to the third exemplary embodiment. This flowchart corresponds to the time information matching checking processing in step S142 of FIG. 13. Each step is implemented by loading a control program loaded from the ROM 103 or an external storage apparatus to the RAM 104 to execute it by the CPU 102 shown in FIG. 1.

The process of this flowchart is similar to the time information matching checking processing shown in FIG. 7, but different from FIG. 7 in that a number of loops corresponding to a plurality of AFEDs are repeated.

First, in step S161, a corresponding loop L1 is started (Loop1S). In step S162, a loop L2 is started until processing is executed for all of the registered AFEDs (LoopS2). Then, in step S163, a determination is made as to whether the timer 161 of the terminal indicates time before time information of the AFED. Then, if it is determined that the timer 161 of the terminal does not indicate time before the time information of the AFED, the process proceeds to step S165.

On the other hand, if it is determined in step S163 that the timer 161 of the terminal indicates time before the time information of the AFED, the abnormality processing shown in FIG. 7 is carried out in step S164. An example of abnormality processing (step S164) is shown in FIG. 8 and is described above.

In step S165, processing from the LoopS2 in step S162 to Loop2E in step S165 is repeated until all of the registered AFEDs have been processed. Upon completion of the processing in step S163 for all of the registered AFEDs, the process exits from the Loop2E in step S165. Then, until reception of a certain end notification, the process resides in the RAM 104 to repeat the processing from the Loop1S in step S161 to the Loop1E in step S166.

FIG. 16 is a flowchart showing an example of another data processing procedure in the information processing apparatus according to the third exemplary embodiment. This flowchart corresponds to the additional AFED registration processing in step S143 of FIG. 13. Each step is implemented by loading a control program loaded from the ROM 103 or an external storage apparatus to the RAM 104 to execute it by the CPU 102 shown in FIG. 1.

First, in step S171, a loop is started (LoopS). In step S172, an additional (second or later) AFED start message is received. Then, in step S173, a determination is made as to whether the additional AFED start message has been received. If not received, the process proceeds to step S175.

On the other hand, if it is determined in step S173 that the additional AFED start message has been received, in step S174, the AFED of a message transmission source is registered as a target of time information updating processing and time information matching checking processing. Then, processing proceeds to step S175.

In step S175, the loop ends (LooPE). This process resides in the RAM 104 until reception of a certain end notification. Accordingly, each of the time information updating processing and the time information matching checking processing resides in the RAM 104, so that the resident processing can be executed for a plurality of AFEDs.

FIG. 17 is a flowchart showing an example of another data processing procedure in the information processing apparatus according to the third exemplary embodiment. This flowchart corresponds to the additional AFED start processing in step S129 of FIG. 12. Each step is implemented by loading a control program loaded from the ROM 103 or an external storage apparatus to the RAM 104 to execute it by the CPU 102 shown in FIG. 1.

In step S181, a start message is transmitted to the AFED resident in the RAM 104. Then, the process ends. The start message transmitted in step S181 is received in step S172 of FIG. 16.

FIG. 18 is a diagram showing AFED start processing in the information processing apparatus according to the third exemplary embodiment. This example indicates an exemplary concept when a plurality (e.g., three) of AFEDs are present in the information processing apparatus 101.

State (a) in FIG. 18 indicates a state where power is not on for the terminal. When the power is turned on for the terminal, as indicated by state (b) in FIG. 18, one AFED is automatically started and resides in the system.

When another AFED is started, it is registered in the AFED that has already been started. Then, the process ends. The AFED resident in the system manages statuses and timer information of all of the documents including the other registered AFEDs.

According to each exemplary embodiment described above, as an electronic document itself includes a time information monitoring unit, strict expiration date checking can be carried out. In addition, versatility is high as a document alone can be copied during copying to another information processing apparatus.

Fourth Exemplary Embodiment

The third exemplary embodiment has been described by taking, as an example, a case where a plurality of AFEDs are started by turns. However, priority information can be added to each AFED, and then the AFED can be registered to reside in the system. Accordingly, among the AFEDs, an AFED of high priority is started to enable updating of time information.

Fifth Exemplary Embodiment

The third exemplary embodiment has been described by taking, as an example, a case where a plurality of AFEDs are started by turns. However, a resident AFED can be switched to be controlled for each start condition, e.g., at the time of power-on or logon of the information processing apparatus 101, recovery of the information processing apparatus 101 from a sleep state, or the like. Thus, among a plurality of AFEDs, an appropriate AFED can reside in the system according to a system situation.

Sixth Exemplary Embodiment

Referring to a memory map of FIG. 19, a configuration of a data processing program readable of an information processing apparatus of the exemplary embodiment will be described below.

FIG. 19 is a diagram showing a memory map of a storage medium for storing various data processing programs readable by an information processing apparatus according to an exemplary embodiment.

Though not particularly shown, information for managing a program group stored in a storage medium, such as version information and a creator, and information dependent on an OS or the like at a program reading side, such as an icon for identifying and displaying a program, can be stored.

Additionally, data subordinate to various programs are managed by a directory. A program for installing various programs into a computer and a program for decompression when a program to be installed is compressed can be stored.

Each function of the exemplary embodiments can be executed by a host computer based on a program installed from the outside. In this case, the present invention can be applied when an information group containing a program is supplied to an output apparatus from a storage medium such as a CD-ROM, a flash memory or a floppy (flexible) disk (FD), or an external storage medium via a network.

As described above, a storage medium storing software program code for realizing the functions of the exemplary embodiments is supplied to a system or an apparatus. A computer (CPU or micro-processing unit (MPU)) of the system or the apparatus reads and executes the program code stored in the storage medium, so that the present invention can be achieved.

In this case, the program code itself read from the storage medium realizes functions of the exemplary embodiments.

Accordingly, as long as the program function is provided, any program form such as object code, a program executed by an interpreter, and script data supplied to an OS can be employed.

For a storage medium to supply a program, for example, a flexile disk, a hard disk, an optical disk, a magneto-optical (MO) disk, a CD-ROM, a CD-recordable (CD-R), a CD-rewritable (CD-RW), a magnetic tape, a nonvolatile memory card, a ROM, a digital versatile disk (DVD), or the like can be used.

In this case, the program code itself read from the storage medium realizes the functions of the exemplary embodiments.

As a program supplying method, a web page in the Internet is connected by using a browser of a client computer. The computer program itself of the present invention or a compressed file containing an automatic installing function can be downloaded from the web page to be supplied. The method can be realized by dividing the program code constituting the program of the present invention into a plurality of files and downloading the files from different web pages. In other words, a WWW server or an FTP server can be used for downloading the program files for realizing the function processing of the present invention to a plurality of users.

The programs of the present invention can be encrypted, and stored in a storage medium such as a CD-ROM to be distributed to the users. A user who satisfies predetermined conditions is permitted to download key information to decrypt the programs from a web page via the Internet. Then, the key information is used to execute the encrypted programs, and the programs are installed into the computer, so that the method can be realized.

Based on an instruction of the program code, a part or all parts of real processing can be carried out by an operating system (OS) running on the computer. Through this processing, the functions of the exemplary embodiments can be realized.

Furthermore, the program code read from the storage medium can be written in a memory disposed in a function expansion board inserted into the computer or a function expansion unit connected to the computer. Then, based on an instruction of the program code, a CPU or the like disposed in the function expansion board or the function expansion unit can execute a part or all parts of real processing, and the functions of the exemplary embodiments can be realized through this processing.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-324745 filed Nov. 9, 2005 and No. 2006-278623 filed Oct. 12, 2006, which are hereby incorporated by reference herein in their entirety.

What is claimed is:

1. An information processing apparatus capable of processing an electronic document, the information processing apparatus comprising:
    a storage unit configured to store an application format electronic document having a data structure containing content data, time information, and a program for monitoring the time information;
    a timer unit;
    a registration unit configured to register an application format electronic document of a readable state obtained from outside in a storage apparatus;
    a registered document determination unit configured to compare time information of the application format electronic document registered by the registration unit with the system time clocked by the timer unit to determine whether the system time is correct; and
    a start unit configured to start the application format electronic document stored in the storage unit,
    wherein the program contained in the application format electronic document started by the start unit is configured to execute processing for monitoring time information of the application format electronic document based on clocked time,
    wherein the start unit is configured to automatically start the application format electronic document when the information processing apparatus is started, when logon processing is executed, or when recovery is made from a sleep state,
    wherein the program of the application format electronic document started by the start unit is configured to update the time information of the application format electronic document stored in the storage unit based on system time clocked by the timer unit and the time information contained in the application format electronic document, and
    wherein the start unit is configured to limit an operation on the registered application format electronic document if the registered document determination unit determines that the system time is not correct.

2. The information processing apparatus according to claim 1, further comprising:
    a communication unit configured to communicate with an external time server for clocking time;
    a synchronization determination unit configured to determine whether synchronization processing for correcting the system time clocked by the timer unit using the time clocked by the timer server via the communication unit has been successful; and
    a correction unit configured to correct the time information of the application format electronic document using the corrected system time when the synchronization determination unit determines that the synchronization processing has been successful.

3. The information processing apparatus according to claim 2, wherein the program of the application format electronic document started by the start unit is configured to execute predetermined error processing when the synchronization determination unit determines that the synchronization processing has not been successful.

4. The information processing apparatus according to claim 1, further comprising:
   a synchronization unit configured to correct the system time by synchronizing time clocked by an external time sever with the time clocked by the timer unit if the registered document determination unit determines that the system time is not correct; and
   a correction unit configured to correct the time information of the application format electronic document using the system time corrected by the synchronization unit.

5. The information processing apparatus according to claim 4, wherein, the start unit is configured to release the operation limit on the application format electronic document whose operation has been limited after the correction of the time information of the application format electronic document by the correction unit is completed.

6. The information processing apparatus according to claim 1, wherein the application format electronic document further contains expiration date information of the document information,
   wherein the information processing apparatus further comprises an expiration date determination unit configured to determine whether the content data is within an expiration date range based on the expiration date information and the system time clocked by the timer unit if an operation request on the application format electronic document is received,
   wherein the start unit is configured not to allow processing of the content data corresponding to the operation request if the expiration date determination unit determines that the content data is not within the expiration date range.

7. The information processing apparatus according to claim 1,
   wherein the program of the application format electronic document started by the start unit determines matching between system time clocked by the timer unit and the time information contained in the application format electronic document.

8. The information processing apparatus according to claim 7, wherein the program of the application format electronic document started by the start unit is configured to execute predetermined error processing if determining that the system time clocked by the timer unit does not match with the time information stored in the application format electronic document.

9. The information processing apparatus according to claim 8, wherein the predetermined error processing includes adding, to the application format electronic document, information for limiting an operation request on the content data of the application format electronic document.

10. The information processing apparatus according to claim 9, wherein the operation request includes at least one of a reading operation request on the content data of the application format electronic document and a writing operation request on the content data of the application format electronic document.

11. The information processing apparatus according to claim 1, wherein the start unit is configured to execute one or both of reading and saving operations for one or both of the content data and the time information of the application format electronic document.

12. The information processing apparatus according to claim 1, wherein the program contained in the application format electronic document continues an execution state even after the application format electronic document is started by the start unit.

13. A method for an information processing apparatus capable of processing an electronic document and having a timer unit, the method comprising:
   storing an application format electronic document having a data structure containing content data, time information, and a program for monitoring the time information in a storage unit;
   registering an application format electronic document of a readable state obtained from outside in a storage apparatus;
   comparing time information of the registered application format electronic document with the system time clocked by the timer unit to determine whether the system time is correct;
   starting the application format electronic document stored in the storage unit;
   causing the program contained in the started application format electronic document to execute processing for monitoring the time information of the application format electronic document based on clocked time;
   automatically starting the application format electronic document when the information processing apparatus is started, when logon processing is executed, or when recovery is made from a sleep state;
   updating the time information of the application format electronic document stored in the storage unit based on system time clocked by the timer unit and the time information contained in the application format electronic document; and
   limiting an operation on the registered application format electronic document if the registered document determination unit determines that the system time is not correct.

14. A computer readable storage medium storing a computer program to cause a computer to execute a method for an information processing apparatus capable of processing an electronic document and having a timer unit, the method comprising:
   storing an application format electronic document having a data structure containing content data, time information, and a program for monitoring the time information stored in a storage unit;
   registering an application format electronic document of a readable state obtained from outside in a storage apparatus;
   comparing time information of the registered application format electronic document with the system time clocked by the timer unit to determine whether the system time is correct;
   starting the application format electronic document stored in the storage unit;
   causing the program contained in the started application format electronic document to execute processing for monitoring the time information of the application format electronic document based on clocked time;
   automatically starting the application format electronic document when the information processing apparatus is started, when logon processing is executed, or when recovery is made from a sleep state;
   updating the time information of the application format electronic document stored in the storage unit based on system time clocked by the timer unit and the time information contained in the application format electronic document; and limiting an operation on the registered application format electronic document if the registered document determination unit determines that the system time is not correct.

15. An information processing apparatus capable of processing an electronic document, the information processing apparatus comprising:
a storage unit configured to store an application format electronic document having a data structure containing content data, time information, and a program for monitoring the time information;
a timer unit; and
a start unit configured to start the application format electronic document stored in the storage unit,
wherein the program contained in the application format electronic document started by the start unit is configured to execute processing for monitoring time information of the application format electronic document based on clocked time,
wherein the start unit is configured to automatically start the application format electronic document when the information processing apparatus is started, when logon processing is executed, or when recovery is made from a sleep state,
wherein the program of the application format electronic document started by the start unit determines matching between system time clocked by the timer unit and the time information contained in the application format electronic document,
wherein the program of the application format electronic document started by the start unit is configured to execute predetermined error processing if determining that the system time clocked by the timer unit does not match with the time information stored in the application format electronic document, and
wherein the predetermined error processing includes adding, to the application format electronic document, information for limiting an operation request on the content data of the application format electronic document.

16. The information processing apparatus according to claim 15, wherein the operation request includes at least one of a reading operation request on the content data of the application format electronic document and a writing operation request on the content data of the application format electronic document.

* * * * *